(12) United States Patent
Sakai et al.

(10) Patent No.: US 10,567,627 B2
(45) Date of Patent: Feb. 18, 2020

(54) POINT OF VIEW CAMERA AND IMAGING DEVICE

(71) Applicant: Sony Corporation, Tokyo (JP)

(72) Inventors: Junichi Sakai, Kanagawa (JP);
Yasuhiro Iizuka, Kanagawa (JP);
Tetsuo Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 14/983,969

(22) Filed: Dec. 30, 2015

(65) Prior Publication Data
US 2017/0195536 A1    Jul. 6, 2017

(51) Int. Cl.
*H04N 5/225* (2006.01)

(52) U.S. Cl.
CPC ......... *H04N 5/2257* (2013.01); *H04N 5/2252* (2013.01); *H04N 5/2254* (2013.01)

(58) Field of Classification Search
CPC .................................................... H04N 5/225
USPC ............. 348/207.99, 333.01, 333.02, 333.05
See application file for complete search history.

(56) References Cited

U.S. PATENT DOCUMENTS

| | | | | |
|---|---|---|---|---|
| 6,188,431 B1* | 2/2001 | Oie | ...................... | H04N 1/2112 348/14.14 |
| 6,871,010 B1* | 3/2005 | Taguchi | ............. | H04N 5/23293 348/220.1 |
| 7,193,647 B2* | 3/2007 | Voss | ..................... | H04N 3/1562 348/220.1 |
| 2007/0015550 A1* | 1/2007 | Kayanuma | ......... | H04N 1/00127 455/575.1 |
| 2007/0082700 A1* | 4/2007 | Landschaft | ............. | H04L 12/66 455/557 |
| 2011/0267432 A1* | 11/2011 | Kumakura | ........... | H04N 5/2252 348/47 |
| 2012/0309462 A1* | 12/2012 | Micev | ................... | G06F 1/1632 455/566 |
| 2013/0150122 A1* | 6/2013 | Kulas | .................. | H04M 1/0254 455/556.1 |
| 2016/0065934 A1* | 3/2016 | Kaza | .................. | H04N 13/0296 348/48 |
| 2016/0286100 A1* | 9/2016 | Kim | ..................... | H02J 7/0052 |

* cited by examiner

*Primary Examiner* — Anthony J Daniels
(74) *Attorney, Agent, or Firm* — Michael Best & Friedrich LLP

(57) ABSTRACT

Provided is a point of view camera that includes: an imaging unit; a body configured to selectively form a mechanical coupling to one of a surfboard, a bicycle, and an associate imaging device; and a communication unit configured to communicate wirelessly or in a wired way with the associate imaging device.

24 Claims, 22 Drawing Sheets

POINT OF VIEW CAMERA AND IMAGING DEVICE

BACKGROUND

The disclosure relates to a point of view (POV) camera and an imaging device.

Currently, various kinds of small-sized video cameras have been developed; one of them is a POV camera. A POV camera is also called "an action camera" or "a sports camera". A POV camera is attachable to various objects such as vehicles typified by bicycles or motorbikes, surfboards, helmets, and human or animal bodies, and allows for photographing that may give a user a sense of presence and reality.

SUMMARY

There has been further pursuit for more diverse styles of photographing of a POV camera, in accordance with applications and objects.

It is desirable to provide a POV camera and an imaging device that allow for more diverse styles of photographing of the POV camera.

According to an embodiment of the disclosure, there is provided a POV camera (1) that includes: an imaging unit; a body configured to selectively form a mechanical coupling to one of a surfboard, a bicycle, and an associate imaging device; and a communication unit configured to communicate wirelessly or in a wired way with the associate imaging device.

In the POV camera (1) according to the embodiment of the disclosure, the body is mechanically coupled to the associate imaging device. The communication unit performs wired or wireless communication with the associate imaging device. Thus, the POV camera is mechanically unified with the associate imaging device; each performs photographing, while allowing various operations to be performed in conjunction with one another, interactively or in synchronization with one another.

According to an embodiment of the disclosure, there is provided a POV camera (2) that includes: an imaging unit that performs photographing with use of a lens having a first angle of view; a body configured to be mechanically coupled to an associate imaging device that performs photographing with use of a lens having a second angle of view that is smaller than the first angle of view; and a communication unit configured to communicate wirelessly or in a wired way with the associate imaging device.

In the POV camera (2) according to the embodiment of the disclosure, the body is mechanically coupled to the associate imaging device. The communication unit performs wired or wireless communication with the associate imaging device. Thus, the POV camera is mechanically unified with the associate imaging device; each performs photographing with different angles of view (photographing with the first angle of view and photographing with the second angle of view), while allowing various operations to be performed in conjunction with one another, interactively or in synchronization with one another.

According to an embodiment of the disclosure, there is provided a POV camera (3) that includes: an imaging unit that generates an image signal and image data; a body configured to be mechanically coupled to an associate imaging device that includes an associate display unit that provides image-display; and a communication unit configured to communicate wirelessly or in a wired way with the associate imaging device. The point of view camera (3) includes no display unit that provides image-display of the image signal and the image data generated by the imaging unit.

In the POV camera (3) according to the embodiment of the disclosure, the body is mechanically coupled to the associate imaging device that includes the associate display unit that provides image-display. The communication unit performs wired or wireless communication with the associate imaging device. Thus, the POV camera is mechanically unified with the associate imaging device; each performs photographing, while allowing various operations to be performed in conjunction with one another, interactively or in synchronization with one another. The various operations include image-display of the image signal and the image data generated by the imaging unit.

According to an embodiment of the disclosure, there is provided an imaging device that includes: an imaging unit; a body configured to be mechanically coupled to one or more associate POV cameras that each are configured to selectively form a mechanical coupling to one of a surfboard, a bicycle, and an associate imaging device, and a communication unit configured to communicate wirelessly or in a wired way with the one or more associate POV cameras.

In the imaging device according to the embodiment of the disclosure, the body is mechanically coupled to the one or more associate POV cameras that each are configured to selectively form a mechanical coupling to one of the surfboard, the bicycle, and the associate imaging device. The communication unit performs wired or wireless communication with the one or more associate POV cameras. Thus, the imaging device is mechanically unified with the one or more associate POV cameras; each performs photographing, while allowing various operations to be performed in conjunction with one another, interactively or in synchronization with one another.

According to the POV camera (1) in the embodiment of the disclosure, the body is configured to selectively form a mechanical coupling to one of the surfboard, the bicycle, and the associate imaging device. The communication unit is configured to communicate wirelessly or in a wired way with the associate imaging device. Hence, it is possible to use the POV camera in combination with the associate imaging device that is different in kind or category from a POV camera, allowing for more diverse styles of photographing of the POV camera.

According to the POV camera (2) in the embodiment of the disclosure, the body is configured to be mechanically coupled to the associate imaging device that performs photographing with use of the lens having the second angle of view that is smaller than the first angle of view. The communication unit is configured to communicate wirelessly or in a wired way with the associate imaging device. Hence, it is possible to use the POV camera in combination with the associate imaging device that is different in the angle of view of the lens, allowing for more diverse styles of photographing of the POV camera.

According to the POV camera (3) in the embodiment of the disclosure, the body is configured to be mechanically coupled to the associate imaging device that includes the associate display unit that provides image-display. The communication unit is configured to communicate wirelessly or in a wired way with the associate imaging device. Hence, it is possible to use the POV camera in combination with the associate imaging device that is different in an image-display function, allowing for more diverse styles of photographing of the POV camera.

According to the imaging device in the embodiment of the disclosure, the body is configured to be mechanically coupled to the one or more associate POV cameras that each are configured to selectively form a mechanical coupling to one of the surfboard, the bicycle, and the associate imaging device. The communication unit is configured to communicate wirelessly or in a wired way with the one or more associate POV cameras. Hence, it is possible to use the imaging device in combination with the one or more associate POV cameras, allowing for more diverse styles of photographing of the one or more associate POV cameras.

It is to be noted that some effects described here are not necessarily limitative, and any of other effects described herein may be achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some embodiments of the disclosure are described in detail with reference to the accompanying drawings. It is to be noted that description is made in the following order.

1. First Embodiment (one example in which one POV camera is mechanically coupled to an imaging device and communicates wirelessly with the imaging device)

2. Second Embodiment (one example in which a plurality of POV cameras are mechanically coupled to an imaging device and communicate wirelessly with the imaging device)

3. Third Embodiment (one examples in which one POV camera is mechanically coupled to an imaging device and communicates in a wired way with the imaging device)

4. Fourth Embodiment (one example in which a plurality of POV cameras are mechanically coupled to an imaging device and communicate in a wired way with the imaging device)

5. Modification Examples (one modification example in which a shoe-mounting member is eliminated in the first embodiment, et cetera)

(First Embodiment)
[Configuration Example]

Figure 1:
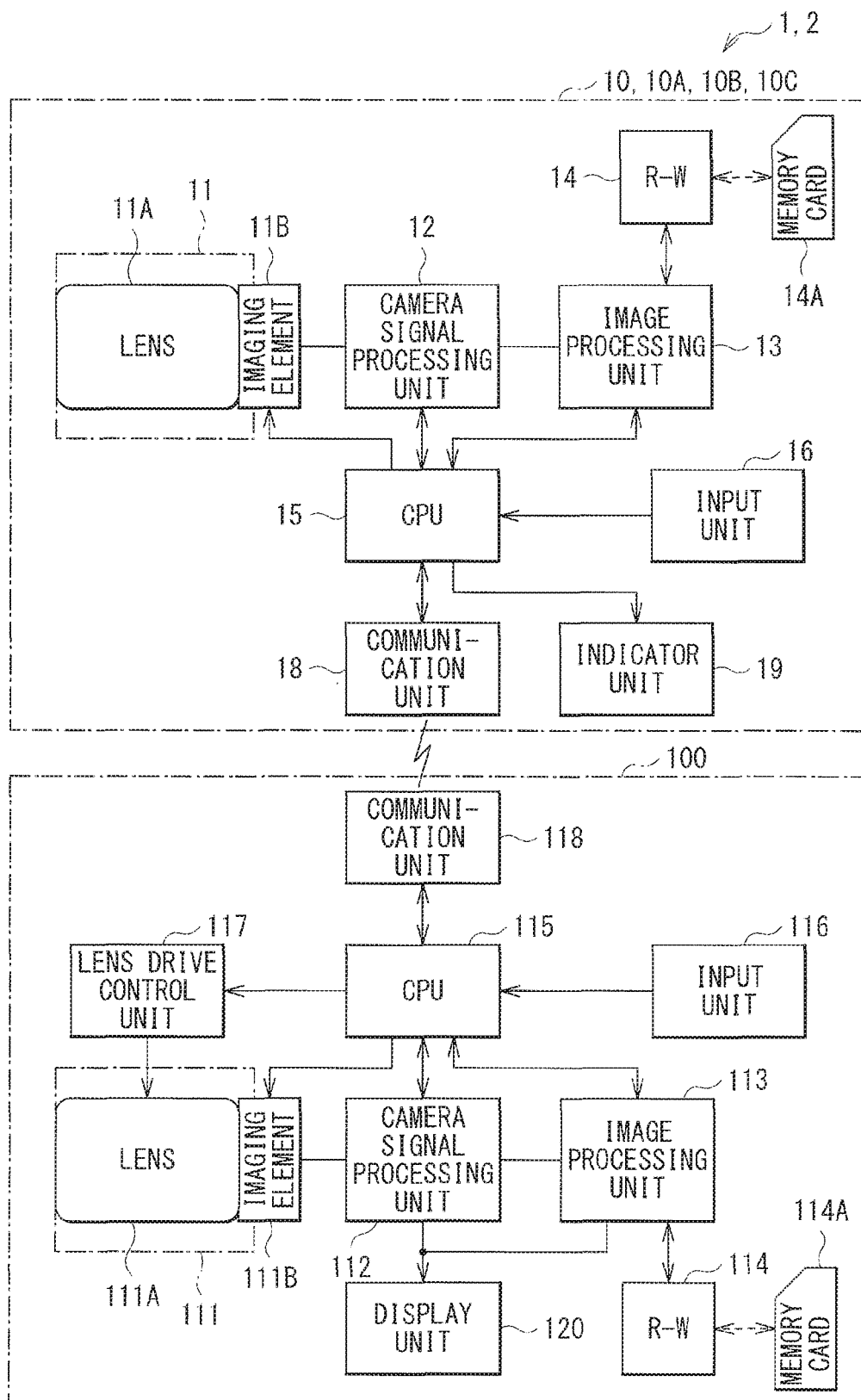
FIG. 1 is a block diagram of an imaging system that includes a POV camera and an imaging device according to a first embodiment of the disclosure.

FIG. 1 illustrates a configuration example of an imaging system 1 according to a first embodiment of the disclosure. The imaging system 1 may be used for photographing/playback of one or both of still images and motion pictures, and may include, for example, one POV camera 10 and an imaging device 100 that is different in kind or category from a POV camera. Here, the term "photographing" may include not only storing, in a recording medium, image data actually captured as a photograph, but also so-called "live-view display", i.e., outputting an image signal of an object image that is currently being generated by an imaging element to a display unit for a user's confirmation.

Figure 2:
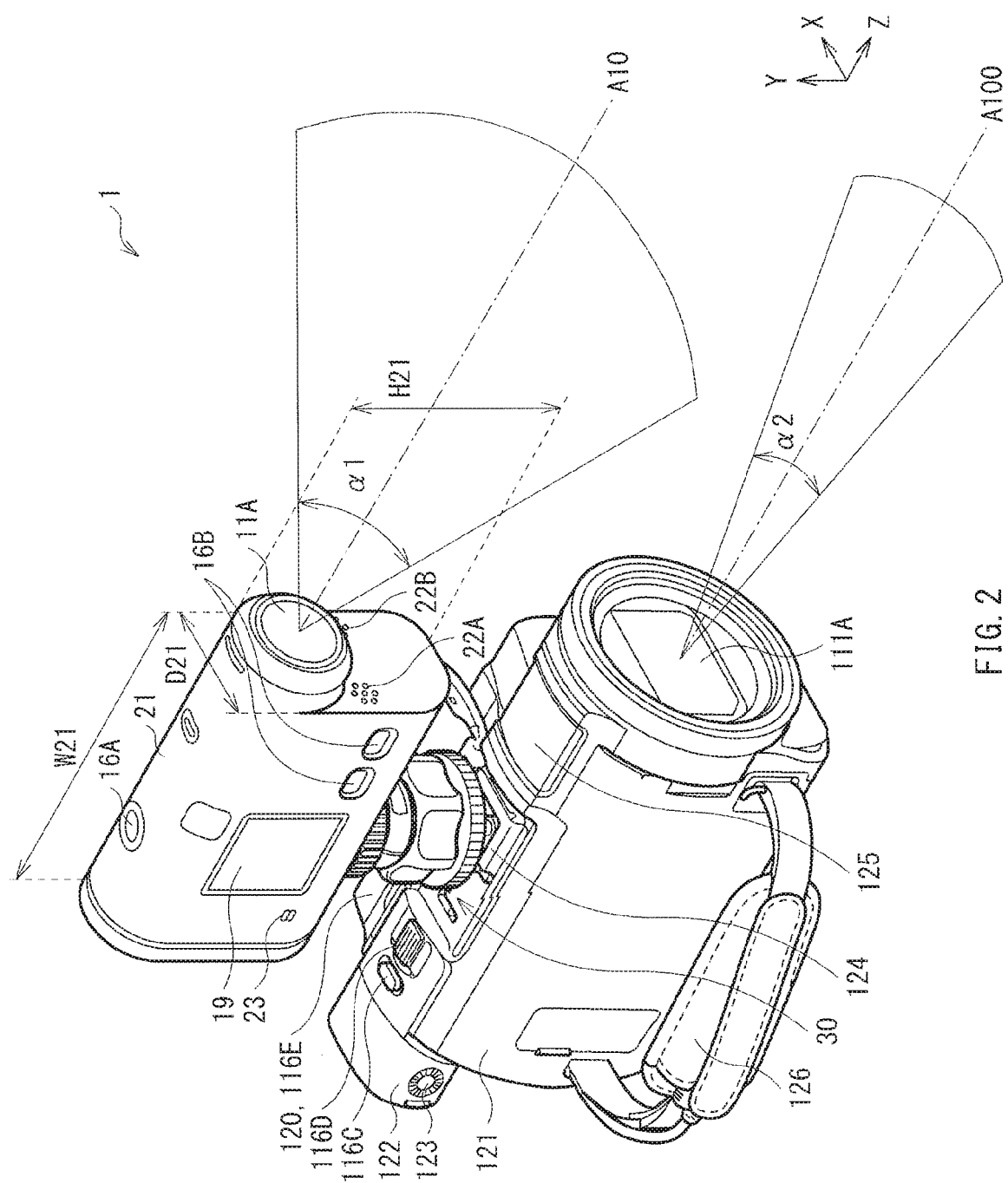
FIG. 2 is a perspective view of an application example of the imaging system illustrated in FIG. 1.

FIG. 2 illustrates an application example of the imaging system 1. In this example, the imaging device 100 may be a camcorder. The imaging device 100 is not limited but may be an imaging device that is different in kind or category from a POV camera. Preferred but non-limiting examples of the imaging device 100 may include a digital video camera such as a camcorder, a digital still camera, a lens-interchangeable camera, a compact camera, a camera-equipped smart device such as a smart phone, a camera-equipped mobile phone, and a camera-equipped personal computer. Note that a smartphone may be sometimes used as a viewer in combination with a lens-style camera. However, in the imaging system 1 in which a smart phone serves as the imaging device 100, the smart phone itself is supposed to perform photographing.

The POV camera 10 is a small-sized video camera that may be also called an "action camera" or a "sports camera". The following is main differences between the POV camera 10 and the imaging device 100 as exemplified above.

First, the POV camera 10 may include a body 21 (refer to FIG. 2) of a small size and light weight.

Second, the POV camera 10 may have a waterproof function. In some cases, the waterproof function may be imparted to the body 21 itself of the POV camera 10; in other cases, the waterproof function may be attained by accommodating the body 21 of the POV camera 10 in a dedicated marine package.

Third, various accessories may be available that allow the POV camera 10 to be mounted on a bicycle, a surfboard, a human body, or other objects.

Fourth, the POV camera 10 is configured to perform point of view (POV) photographing or subjective photographing in which a line of sight of a camera coincides with a line of sight of an object. Meanwhile, the imaging device 100 is suitable for photographing other than the POV photographing. That is, in the photographing of the imaging device 100, a line of sight of a photographer who holds the camera does not always coincide with the line of sight of an object. Such photographing is sometimes called objective photographing in comparison with the POV photographing, i.e., the subjective photographing.

Fifth, the POV camera 10 has a relatively large angle of view of photographing.

Sixth, for purpose of down-sizing, the POV camera 10 sometimes does not include a display unit that provides image-display.

Herein, a direction of an optical axis (a front-and-rear direction of a camera) is denoted as a Z direction; a horizontal direction (a right-and-left direction) an X direction; and a vertical direction (an up-and-down direction) a Y direction. The front is defined as on the object side along the direction of the optical axis; and the rear on the camera side. The right and left directions are defined as viewed from the front. Note that an optical axis A10 of a lens 11A of the POV camera 10 and an optical axis A100 of a lens 111A of the imaging device 100 may be parallel to each other as illustrated in FIG. 2, or may be unparallel to each other.

(POV Camera)

As illustrated in FIG. 1, the POV camera 10 may include, for example, an imaging unit 11, a camera signal processing unit 12, an image processing unit 13, a R/W (reader/writer) 14, a CPU (Central Processing Unit) 15, an input unit 16, a communication unit 18, and an indicator unit 19.

Moreover, as illustrated in FIG. 2, the POV camera 10 may further include the body 21. The body 21 is adapted to accommodate the imaging unit 11, the camera signal processing unit 12, the image processing unit 13, the R/W 14, the CPU 15, the input unit 16, the communication unit 18, and the indicator unit 19.

The body 21 is configured to selectively form a mechanical coupling to one of a surfboard, a bicycle, and the imaging device 100.

Here, the term "selectively" refers to being mechanically coupled to one selected from the surfboard, the bicycle, and the imaging device 100, because the POV camera 10 is generally not mechanically coupled, at same time, to the surfboard, the bicycle, and the imaging device 100.

Specifically, the body 21 may be mechanically coupled to the surfboard with a surfboard-mounting member (not illustrated) in between. Alternatively, the body 21 may be mechanically coupled to the bicycle with a bicycle-mounting member (not illustrated) in between. In another alternative, as illustrated in FIG. 2, the body 21 may be mechanically coupled to, for example, a shoe 124 of the imaging device 100 with a shoe-mounting member 30 in between.

Note that objects of the selective mechanical coupling of the POV camera 10 are not limited to the three as described above. Preferred but non-limiting examples may include vehicles on land, a surfboard, a sports board such as a snowboard, sports equipment used in, for example, skiing, vessels on water, a body of a human or a pet animal, and accessories therefor. Preferred but non-limiting examples of the vehicles on land may include two-wheeled vehicles such as a bicycle and a motorbike, and four-wheeled vehicles such as an automobile. Preferred but non-limiting examples of the vessels on water may include a boat such as a yacht and a kayak.

The imaging unit 11 may include, for example, an optical system including the lens 11A, and an imaging element 11B. The imaging element 11B may include a CMOS (Complementary Metal Oxide Semiconductor) image sensor or a CCD (Charge Coupled Device). The imaging element 11B is adapted to convert an optical image formed by the lens 11A to an electric signal to output a photographing signal (i.e., an image signal) in accordance with the optical image. In the POV camera 10, the lens 11A is generally fixed and not interchangeable.

The camera signal processing unit 12 is adapted to perform various signal processing on the image signal outputted from the imaging element 11B. Non-limiting examples of the signal processing may include analog-digital conversion, noise reduction, image quality correction, conversion to a luminance/color-difference signal.

The image processing unit 13 is adapted to perform recording and playback processing of the image signal. Specifically, the image processing unit 13 is adapted to perform processing such as compression-coding and expansion-decoding of the image data based on a predetermined image data format, digital zooming, and conversion processing of data specifications such as resolution.

R/W 14 is adapted to write the image data coded by the image processing unit 13 in a memory card 14A, and to read the image data recorded in the memory card 14A. The memory card 14A may be, for example, a semiconductor memory attachable to and detachable from a slot that is coupled to the R/W 14. Note that the image data may be recorded in the memory card 14A, or in an undepicted internal memory of the POV camera 10.

The CPU 15 may serve as a control processing unit that controls circuit blocks provided in the POV camera 10, and is adapted to control the circuit blocks based on signals such as an instruction input signal from the input unit 16.

The input unit 16 may include various switches that are adapted to accept a user's operation of the POV camera 10. The input unit 16 may include, for example, a recording start/stop button, a menu determination button, and a menu selection button, and is adapted to output, to the CPU 15, the instruction input signal in accordance with the user's operation. The input unit 16 may take any form such as a button, a dial, a level, a switch, and a touch panel.

The communication unit 18 is configured to communicate, for example, wirelessly with the imaging device 100. Preferred but non-limiting examples of wireless communication may include Wi-Fi (a registered trademark or a trademark of Wi-Fi Alliance), Bluetooth (a registered trademark of Bluetooth SIG Inc.), near field communication technology such as NFC (Near Field Communication). Note that the communication unit 18 may communicate with a smart phone; the image signal or the image data generated by the imaging unit 11 may be transmitted to the smart phone through the communication unit 18, and may be displayed on a display unit of the smart phone; a camera control signal transmitted from the smart phone may be received by the communication unit 18, and the POV camera 10 may be controlled based on the camera control signal thus received.

The indicator unit 19 is adapted to provide indication of setting information of the POV camera 10 with characters or icons. The setting information of the POV camera 10 may include, for example, resolution, remaining capacity of a battery, time available for photographing, modes of the POV camera 10. The indicator unit 19 does not have a function of image-display.

The body 21 may have, for example, a flat shape as illustrated in FIG. 2, in which a thickness D21 (a dimension in the X direction) is smaller than a width W21 (a dimension in the Z direction) and a height H21 (a dimension in the Y direction), and the width W21 is larger than the height H21. Note that the shape of the body 21 is not limited to the example as described above. For example, the body 21 may have a flat shape in which the width W21 is smaller than the thickness D21 and the height H21, and the thickness D21 is larger than the height H21. Alternatively, the body 21 may have a shape in which the height H21 is smaller than the thickness D21 and the width W21, and the thickness D21 is larger than the height H21. The lens 11A, and microphones 22A and 22B may be provided on a front surface of the body 21. The recording start/stop button 16A of the input unit 16 may be provided on a top surface of the body 21. The recording start/stop button 16A may also serve as the menu determination button. The menu selection button 16B of the input unit 16, the indicator unit 19, and a speaker 23 may be provided on a side surface of the body 21. Note that arrangement of these components on the body 21 is not limited to the example as described above. For example, either of the recording start/stop button 16A and the menu selection button 16B of the input unit 16, and the indicator unit 19 may be provided on the front surface of the body 21.

(Imaging Device 100)

The imaging device 100 may include, for example, an imaging unit 111, a camera signal processing unit 112, an image processing unit 113, an R/W 114, a CPU 115, an input unit 116, a lens drive control unit 117, a communication unit 118, and a display unit 120.

Moreover, as illustrated in FIG. 2, the imaging device 100 may further include the body 121. The body 121 is adapted to accommodate the imaging unit 111, the camera signal processing unit 112, the image processing unit 113, the R/W 114, the CPU 115, the input unit 116, the lens drive control unit 117, the communication unit 118, and the display unit 120.

The body 121 is configured to be mechanically coupled to the POV camera 10. Specifically, for example, as illustrated in FIG. 2, the body 121 may be mechanically coupled to the body 21 of the POV camera 10 with the shoe-mounting member 30 in between.

The imaging unit 111 may include, for example, an optical system including the lens 111A, and an imaging element 111B. The imaging element 111B may include a CMOS image sensor or a CCD. The imaging element 111B is adapted to convert an optical image formed by the lens 111A to an electric signal to output a photographing signal (i.e., an image signal) in accordance with the optical image. In the imaging device 100, the lens 111A may be fixed, or may be interchangeable.

The camera signal processing unit 112 is adapted to perform various signal processing on the image signal outputted from the imaging element 111B. Non-limiting examples of the signal processing may include analog-digital conversion, noise reduction, image quality correction, conversion to a luminance/color-difference signal.

The image processing unit 113 is adapted to perform recording and playback processing of the image signal. Specifically, the image processing unit 113 is adapted to perform processing such as compression-coding and expansion-decoding of the image data based on a predetermined image data format, and conversion processing of data specifications such as resolution.

R/W 114 is adapted to write the image data coded by the image processing unit 113 in a memory card 14A, and to read the image data recorded in the memory card 114A. The memory card 114A may be, for example, a semiconductor memory attachable to and detachable from a slot that is coupled to the R/W 114. Note that the image data may be recorded in the memory card 114A, or in an undepicted internal memory of the imaging device 100. In one embodiment of the disclosure, the R/W 114 and the memory card 114A may serve as a "storage unit" of the imaging device 100.

The CPU 115 may serve as a control processing unit that controls circuit blocks provided in the imaging device 100, and is adapted to control the circuit blocks based on signals such as an instruction input signal from the input unit 116.

The input unit 116 may include various switches that are adapted to accept a user's operation of the imaging device 100. The input unit 116 may include, for example, a recoding start/stop button, an image playback button, a still image photographing button, a zoom lever, and a touch panel provided on a screen of the display unit 120, and is adapted to output, to the CPU 115, the instruction input signal in accordance with the user's operation. The input unit 116 may take any form such as a button, a dial, a level, a switch, and a touch panel.

The lens drive control unit 117 is adapted to control drive of the lens 111A disposed in the imaging unit 111. The lens drive control unit 117 is adapted to control, for example, an undepicted motor that drives the lens 111A based on a control signal from the CPU 115.

The communication unit 118 is configured to communicate, for example, wirelessly with the POV camera 10. Preferred but non-limiting examples of the wireless communication may include Wi-Fi (a registered trademark or a trademark of Wi-Fi Alliance), Bluetooth (a registered trademark of Bluetooth SIG, Inc.), near field communication technology such as NFC.

The display unit 120 may include, for example, a liquid crystal panel, and may serve as a monitor that provides image-display of the image signal and the image data generated by the imaging unit 111. Moreover, the display unit 120 may provide indication of setting information of the imaging device 100 with characters or icons. The setting information of the imaging device 100 may include, for example, resolution, remaining capacity of a battery, and time available for photographing. On the screen of the display unit 120, the touch panel of the input unit 116 may be provided. The touch panel is adapted to accept the user's operation of the imaging device 100, and may constitute part of the input unit 116. Note that the imaging device 100 may further include an indicator unit, although not illustrated, separately from the display unit 120. The indicator unit is adapted to provide indication of the setting information of the imaging device 100 with characters or icons.

The body 121 may have, for example, a tubular shape as illustrated in FIG. 2. The lens 111A may be provided on a front surface of the body 121. The recording start/stop button and an image playback button of the input unit 116, a view finder 122, a diopter adjustment dial 123, and a battery attachment section may be provided on a rear surface of the body 121. The still image photographing button 116C and the zoom lever 116D of the input unit 116, the shoe 124, and an internal microphone 125 may be provided on a top surface of the body 121. The display unit 120 may be provided in an openable and closable state on one side surface of the body 121. A grip belt 126 may be attached to another side surface of the body 121. On the screen of the display unit 120, the touch panel 116E of the input unit 116 may be provided. Note that arrangement of these components on the body 121 is not limited to the example as described above.

The shoe 124 may be, for example, a hot shoe that includes an electronic contact (not illustrated). Specifically, the shoe 124 may be a multi-interface shoe (a trademark of Sony Corporation), to which various external equipment such as a microphone, a light, and an electronic view finder may be coupled.

(Imaging Unit 11 of POV Camera 10 and Imaging Unit 111 of Imaging Device 100)

The imaging unit 11 of the POV camera 10 may have specifications suitable for the POV photographing as mentioned above. The imaging unit 111 of the imaging device 100 may have specifications suitable for the photographing other than the POV photographing as mentioned above. Non-limiting examples of the specifications may include an angle of view (as described below), and sizes or weight of the lenses 11A and 111A.

In other words, as illustrated in FIG. 2, the imaging unit 11 of the POV camera 10 performs photographing with use of the lens 11A having a first angle of view $\alpha 1$. The imaging device 100 performs photographing with use of the lens 111A having a second angle of view $\alpha 2$ that is smaller than the first angle of view $\alpha 1$.

Figure 3:
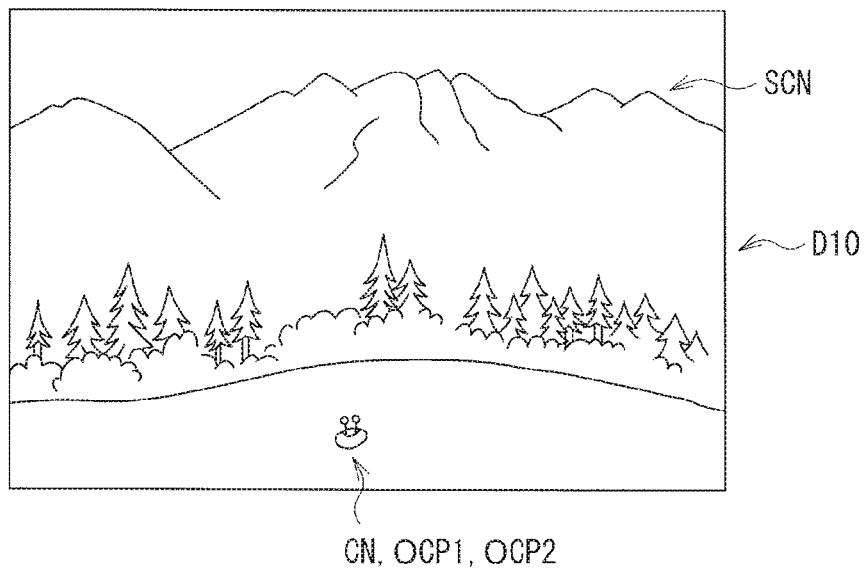
FIG. 3 is a diagram of one example of image data generated by the POV camera illustrated in FIG. 2.
Figure 4:
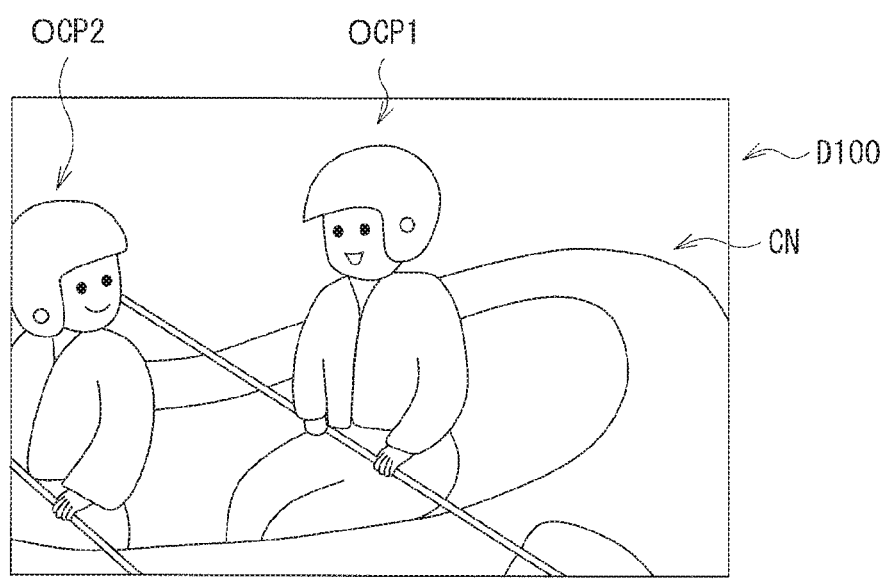
FIG. 4 is a diagram of one example of image data generated by the imaging device illustrated in FIG. 2.

For purpose of example, the lens 11A may be a wide-angle lens having the first angle of view $\alpha 1$ of, for example, about 160°. As illustrated in FIG. 3, the image data D10 generated by the POV camera 10 may include, for example, background scenery SCN, in addition to an object, e.g., a canoe CN, and its occupants OCP1 and OCP2. Meanwhile, the lens 111A may be, for example, a telephoto lens. As illustrated in FIG. 4, the image data D100 generated by the imaging device 100 may include, in a close-up manner, the object, e.g., the canoe CN, and its occupants OCP and OCP2.

Note that the second angle of view $\alpha 2$ may be varied depending on the category of the imaging device 100 or a category of the lens 111A, but may be generally smaller than the first angle of view $\alpha 1$. For example, an upper limit ($\alpha A$) of a range of an angle of view available for photographing of the imaging device 100 may be smaller than a lower limit ($\alpha B$) of a range of an angle of view available for photographing of the POV camera 10. Alternatively, for example, these ranges of the angles of views may partly overlap, and the upper limit $\alpha A$ may be larger than the lower limit $\alpha B$. In another alternative, for example, the upper limit $\alpha A$ may be equal to the lower limit $\alpha B$.

Furthermore, in other words, the POV camera 10 includes no display unit that provides image-display of the image signal and the image data D10 generated by the imaging unit 11. The imaging device 100 includes the display unit 120 that provides image-display. Specifically, in the POV camera 10, the imaging unit 11 generates the image signal and the image data D10, but no image-display of the image signal and the image data D10 is provided on the POV camera 10 itself. In the imaging device 100, the display unit 120 provides image-display of the image signal and the image data D100 generated by the imaging unit 111.

(Coupling Relation Between POV Camera 10 and Imaging Device 100)

As described, the POV camera 10 includes the imaging unit 11, the body 21, and the communication unit 18. The body 21 is configured to selectively form a mechanical coupling to one of the surfboard, the bicycle, and the imaging device 100. The communication unit 18 is configured to communicate wirelessly with the imaging device 100.

In other words, the POV camera 10 includes the imaging unit 11, the body 21, and the communication unit 18. The imaging unit 11 performs photographing with use of the lens 11A having the first angle of view $\alpha 1$. The body 21 is configured to be mechanically coupled to the imaging device 100 that performs photographing with use of the lens 11A having the second angle of view $\alpha 2$ that is smaller than the first angle of view $\alpha 1$. The communication unit 18 is configured to communicate wirelessly with the imaging device 100.

In other words, the POV camera 10 includes the imaging unit 11, the body 21, and the communication unit 18. The imaging unit 11 generates the image signal and the image data D10. The body 21 is configured to be mechanically coupled to the imaging device 100 that includes the display unit 120 that provides image-display. The communication unit 18 is configured to communicate wirelessly with the imaging device 100. The point of view camera 10 includes no display unit that provides image-display of the image signal and the image data D10 generated by the imaging unit 11.

With these configurations, in the POV camera 10, it is possible to use the POV camera 10 in combination with the imaging device 100 that is different in kind or category from a POV camera, allowing for more diverse styles of photographing of the POV camera 10, allowing for more diverse styles of photographing of the POV camera 10.

The imaging device 100 includes the imaging unit 111, the body 121, and the communication unit 118. The body 121 is configured to be mechanically coupled to the POV camera 10 that is configured to selectively form a mechanical coupling to one of the surfboard, the bicycle, and the imaging device 100. The communication unit 118 is configured to communicate wirelessly with the POV camera 10.

In other words, the imaging device 100 includes the imaging unit 111, the body 121, and the communication unit 118. The imaging unit 111 performs photographing with use of the lens 111A having the second angle of view α2. The body 121 is configured to be mechanically coupled to the POV camera 10 that performs photographing with use of the lens 11A having the first angle of view α1 that is larger than the second angle of view α2. The communication unit 118 is configured to communicate wirelessly with the POV camera 10.

In other words, the imaging device 100 includes the imaging unit 111, the display unit 120, the body 121, and the communication unit 118. The display unit 120 provides image-display. The body 121 is configured to be mechanically coupled to the POV camera 10 that generates the image signal and the image data D10 but includes no display unit that provides image-display of the image signal and the image data D10 generated. The communication unit 118 is configured to communicate wirelessly with the POV camera 10.

With these configurations, in the imaging device 100, it is possible to use the imaging device 100 in combination with the POV camera 10, allowing for more diverse styles of photographing of the POV camera 10.

(Shoe-Mounting Member 30)

Figure 5:
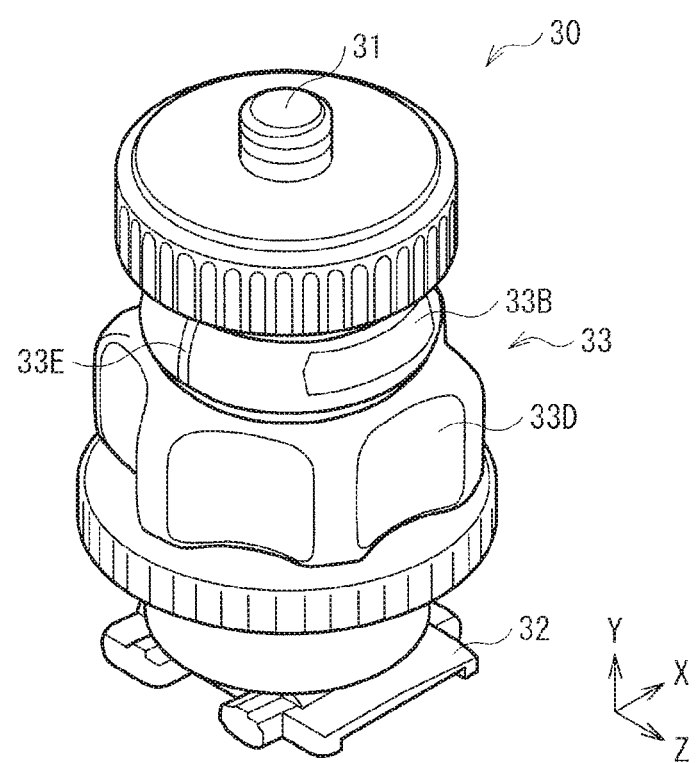
FIG. 5 is a perspective view of a shoe-mounting member illustrated in FIG. 2.
Figure 6:
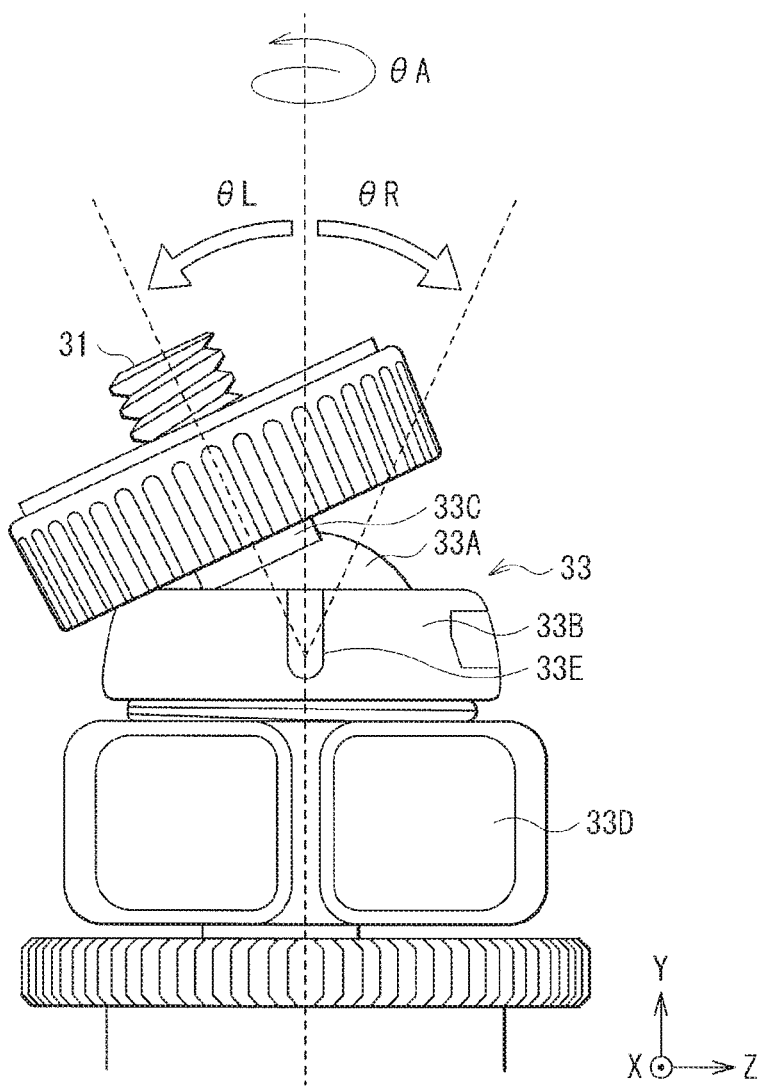
FIG. 6 is a side view of a part of the shoe-mounting member illustrated in FIG. 5.

The body 21 is configured to be mechanically coupled to, for example, the shoe 124 of the imaging device 100 with the shoe-mounting member 30 in between, as illustrated in FIG. 2. The shoe-mounting member 30 may include, for example, a tripod screw 31, a foot 32, and a free platform 33, as illustrated in FIG. 5. The tripod screw 31 is configured to be fastened to the body 21 of the POV camera 10. The foot 32 is configured to be fitted in the shoe 124 of the imaging device 100. For example, the foot 32 includes no electronic contact that forms electrical coupling to the shoe 124, and is configured to fix the shoe-mounting member 30 to the shoe 124 simply by mechanically fitting in the shoe 124. The free platform 33 may be provided between the tripod screw 31 and the foot 32. The free platform 33 may include, for example, as illustrated in FIG. 6, a ball 33A, a socket 33B, a support 33C, and a clamp knob 33D. The socket 33B may be provided with a vertical line 33E that may serve as a reference to a tilt of the POV camera 10. The support 33C may be continuous with the tripod screw 31. The ball 33A may be freely rotatable inside the socket 33B, thereby allowing for adjustment of a rotational angle θA (e.g., 360°), and tilt angles θR and θL (e.g., 30° each) with respect to the vertical line 33E, of the POV camera 10 fixed to the tripod screw 31.

Figure 7:
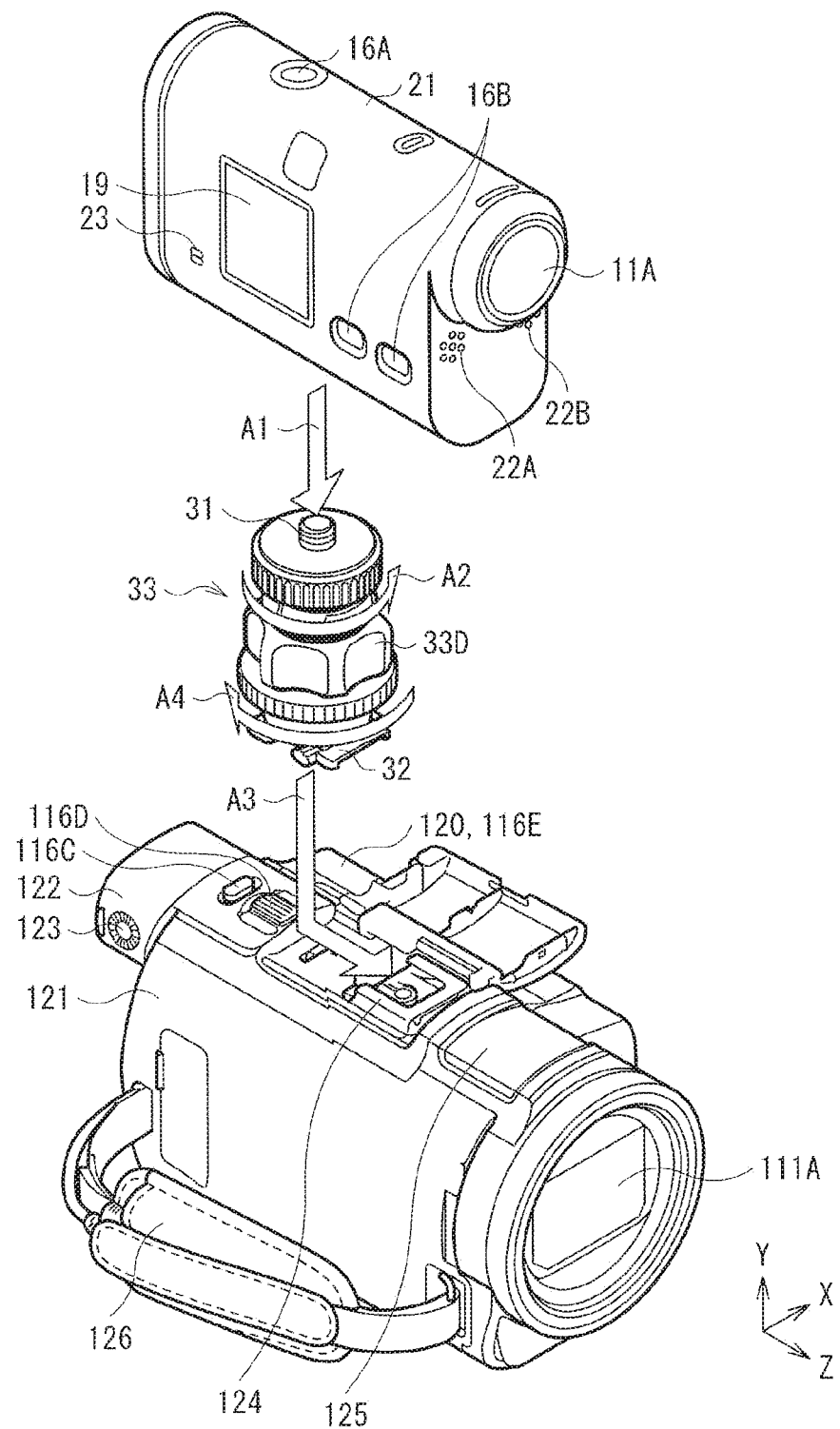
FIG. 7 is a perspective view of one example of a procedure of mechanically coupling the POV camera to the imaging device with use of the shoe-mounting member illustrated in FIG. 5.

The mechanical coupling of the POV camera 10 to the imaging device 100 with use of the shoe-mounting member 30 may be carried out, for example, in a procedure as follows. For example, as illustrated in FIG. 7, the body 21 of the POV camera 10 may be fixed to the tripod screw 31 (as denoted by arrows A1 and A2 in FIG. 7). Next, the foot 32 may be fitted in the shoe 124 of the imaging device 100 (as denoted by arrows A3 and A4 in FIG. 7). Last, with use of the free platform 33, the rotational angle θA, and the tilt angles θR and θL of the POV camera 10 may be adjusted, and the clamp knob 33D may be fastened to fix the POV camera 10 in a desired orientation.

[Operation and Workings]

Description is given next on operation and workings of the imaging system 1 according to the embodiment.

(Single Operation of POV Camera 10)

In a photographing standby state, under control of the CPU 15, the image signal may be generated by the imaging unit 11. In a case of the POV camera 10 provided with no display unit, no image-display of the image signal thus generated is provided on the POV camera 10.

Note that, although the POV camera 10, being small-sized and light-weighted with various accessories available, is suitable for the POV photographing, the POV camera 10 also performs photographing other than the POV photographing. Accordingly, when used independently, the POV camera 10 may perform the so-called POV photographing as one of its applications, or may be used for other purposes than the POV photographing.

When the menu selection button 16B and the menu determination button 16A of the input unit 16 are operated, the input unit 16 may generate the instruction input signal of switching of modes of the POV camera 10, and may input, to the CPU 15, the instruction input signal thus generated. The modes of the POV camera 10 may include, for example, the following four: moving picture photographing; one still image photographing; sequential still image photographing; and still image photographing at constant time intervals. Indication of the mode thus determined may be provided on the indicator unit 19 with characters or icons.

When the recording start/stop button 16A of the input unit 16 is operated, the input unit 16 may generate the instruction input signal of execution of photographing of the POV camera 10, and may input, to the CPU 15, the instruction input signal thus generated. Under the control of the CPU 15, the imaging unit 11 may execute photographing to generate the image signal. The image signal thus generated may be outputted from the camera signal processing unit 12 to the image processing unit 13, where the image signal may be subjected to the compression-coding and the conversion to the digital image data of a predetermined data format. The image data thus converted may be outputted to the R/W 14 and may be written in the memory card 14A.

(Single Operation of Imaging Device 100)

In a photographing standby state, under control of the CPU 115, the image signal may be generated by the imaging unit 111. The image signal thus generated may be outputted from the camera signal processing unit 112 to the display unit 120, where image-display of the image signal may be provided as a through-the-lens image (the live-view display). Here, the term the "through-the-lens image" may refer to an image of the image signal generated by the image processing unit 130 through predetermined signal processing of pixel data that is currently being captured by the imaging element 111B; the image of the image signal may be shown on the display unit 120 in real time, but some time delay due to processing capability may be allowed. It does not matter whether or not the image of the image signal is stored in the memory card 114A. The through-the-lens image may be also displayed on the view finder 122.

When the recording start/stop button of the input unit 116 is operated, the input unit 116 may generate the instruction input signal of motion picture photographing, and may input, to the CPU 115, the instruction input signal thus generated. Under control of the CPU 115, the imaging unit 111 may perform motion picture photographing to generate the image signal. The image signal thus generated may be outputted from the camera signal processing unit 112 to the image processing unit 113, where the image signal may be subjected to the compression-coding and the conversion to the digital image data of a predetermined data format. The image data thus converted may be outputted to the display unit 120, where image-display of the image data may be provided. Meanwhile, the image data thus converted may be outputted to the R/W 114, and may be written in the memory card 114A.

In the motion picture photographing, when the still image photographing button 116C of the input unit 116 is operated, the input unit 116 may generate the instruction input signal of still image photographing, and may input, to the CPU 115, the instruction input signal thus generated. Under the control of the CPU 115, the imaging unit 111 may perform still image photographing to generate the image signal. The image signal thus generated may be outputted from the camera signal processing unit 112 to the image processing unit 113, where the image signal may be subjected to the compression-coding and the conversion to the digital image data of a predetermined data format. The image data thus converted may be outputted to the display unit 120, where image-display of the image data may be provided. Meanwhile, the image data thus converted may be outputted to the R/W 114, and may be written in the memory card 114A.

When the zoom lever 116D of the input unit 116 is operated, the input unit 116 may generate the instruction input signal of zooming, and may input, to the CPU 115, the instruction input signal thus generated. Based on the instruction input signal, the CPU 115 may output the control signal to the lens drive control unit 117. Under control of the lens drive control unit 117, the lens 111A and the imaging element 111B may move relatively to one another.

When the image playback button of the input unit 116 is operated, the input unit 116 may generate the instruction input signal of image playback, and may input, to the CPU 115, the instruction input signal thus generated. Under the control of the CPU 115, the display unit 120 may provide display of a list of the image data D100 recorded in the memory card 114A. On the screen of the display unit 120, the touch panel 116E of the input unit 116 may be provided. When the touch panel 116 of the input unit 116 accepts a user's selection from the list, the input unit 116 may generate the instruction input signal of playback of the selected image data D100, and may input, to the CPU 115, the instruction input signal thus generated. Under the control of the CPU 115, the image data D100 may be read from the memory card 114A by the R/W 114. The image data D100 thus read may be subjected to the expansion-decoding to generate a playback image signal. The playback image signal may be outputted to the display unit 120, where image-display of the playback image signal may be provided.

(Cooperative Operation of POV Camera 10 and Imaging Device 100)

In the embodiment, furthermore, the communication units 18 and 118 may allow various operations to be performed between the POV camera 10 and the imaging device 100 in conjugation with one another, interactively or in synchronization with one another.

Note that, when the POV camera 10 is coupled to the imaging device 100 such as a video camera as illustrated in FIG. 2, the POV camera 10 is not aimed for the POV photographing, but performs the photographing other than the POV photographing. Specifically, the POV camera 10 performs the photographing other than the POV photographing, as an auxiliary camera of the imaging device 100 that is a video camera that mainly performs the photographing other than the POV photographing, or as a camera that performs photographing from a different angle or with a different angle of view from those of the imaging device 100.

For example, the input unit 116 of the imaging device 100 may accept an operation of the POV camera 10. Based on the operation thus accepted, the input unit 116 may generate the instruction input signal regarding the POV camera 10. The communication unit 118 of the imaging device 100 may transmit the instruction input signal thus generated, to the communication unit 18 of the POV camera 10. The communication unit 18 of the POV camera 10 may receive the instruction input signal thus generated, from the communication unit 118 of the imaging device 100.

The instruction input signal regarding the POV camera 10 may include, for example, one or more of zooming in the POV camera 10, execution of photographing of the POV camera 10 in synchronization with photographing of the imaging device 100, switching of the modes of the POV camera 10, storage of the image data D10 generated by the POV camera 10, and image-display of the image signal and the image data D10 generated by the POV camera 10. In the following, description is given on details of each case.

(Zooming)

The input unit 116 of the imaging device 100, specifically the zoom lever 116D, may accept an operation of zooming in the POV camera 10 in synchronization with zooming in the imaging device 100. The operation may be accepted in advance before photographing, or may be accepted not only before photographing but also during photography.

In this case, the input unit 116, specifically the touch panel 116E, may accept an operation of selection on whether to perform the zooming in the POV camera 10 in synchronization with the zooming in the imaging device 100 according to an operation of the zoom lever 116D. The operation may be accepted in advance before photographing, or may be accepted not only before photographing but also during photography.

Alternatively, the zooming in the POV camera 10 may be performed independently from the zooming in the imaging device 100. In this case, for example, the input unit 116 of the imaging device 100, specifically the touch panel 116E, may accept an operation of the zooming in the POV camera 10. The operation may be accepted in advance before photographing, or may be accepted not only before photographing but also during photography.

Based on the operation thus accepted, the input unit 116 may generate the instruction input signal of POV camera zooming, i.e., the instruction input signal of the zooming in the POV camera 10. The instruction input signal of POV camera zooming may be inputted to the communication unit 118. The communication unit 118 may transmit the instruction input signal of POV camera zooming, to the communication unit 18 of the POV camera 10.

The communication unit 18 of the POV camera 10 may receive the instruction input signal of POV camera zooming, from the communication unit 118 of the imaging device 100. The communication unit 18 may input, to the CPU 15, the instruction input signal thus received. Under the control of the CPU 15, the image processing unit 13 may perform, for example, digital zooming.

Note that description is given here on a case in which the image processing unit 13 of the POV camera 10 performs digital zooming. However, the POV camera 10 may be provided with a lens drive control unit similar to the lens drive control unit 117 of the imaging device 100, to perform optical zooming.

(Synchronous Photographing)

The input unit 116 of the imaging device 100, specifically the recording start/stop button, may accept an operation of the execution of photographing of the POV camera 10 in synchronization with the photographing of the imaging device 100.

Based on the operation thus accepted, the input unit 116 may generate the instruction input signal of synchronous photographing, i.e., the instruction input signal of the execution of photographing of the POV camera 10 in synchronization with the photographing of the imaging device 100. The instruction input signal of synchronous photographing may be inputted to the communication unit 118. The communication unit 118 may transmit the instruction input signal of synchronous photographing, to the communication unit 18 of the POV camera 10.

The communication unit 18 of the POV camera 10 may receive the instruction input signal of synchronous photographing, from the communication unit 118 of the imaging device 100. The communication unit 18 may input, to the CPU 15, the instruction input signal thus received. Under the control of the CPU 15, the imaging unit 11 may perform photographing in synchronization with the photographing of the imaging device 100.

Here, when the mode of the POV camera 10 is set to the motion picture photographing, upon the operation of the input unit 116 of the imaging device 100, specifically upon pressing of the recording start/stop button, the motion picture photographing may be started in the imaging device 100, while motion picture photographing may be also started in the POV camera 10. Upon pressing again of the recording start/stop button, the motion picture photographing of the imaging device 100 may be stopped, while the motion picture photographing of the POV camera 10 may be also stopped.

When the mode of the POV camera 10 is set to the one still image photographing, upon the operation of the input unit 116 of the imaging device 100, specifically upon pressing of the recording start/stop button, the motion picture photographing may be started in the imaging device 100, while one still image may be photographed in the POV camera 10. Upon pressing again of the recording start/stop button, the motion picture photographing of the imaging device 100 may be stopped, while one more still image may be photographed in the POV camera 10.

When the mode of the POV camera 10 is set to the sequential still image photographing, upon the operation of the input unit 116 of the imaging device 100, specifically upon pressing of the recording start/stop button, the motion picture photographing may be started in the imaging device 100, while a predetermined number of still images may be sequentially photographed in the POV camera 10. Upon pressing again of the recording start/stop button, the motion picture photographing of the imaging device 100 may be stopped, while the predetermined number of more still images may be sequentially photographed in the POV camera 10.

When the mode of the POV camera 10 is set to the still image photographing at constant time intervals, upon the operation of the input unit 116 of the imaging device 100, specifically upon pressing of the recording start/stop button, the motion picture photographing may be started in the imaging device 100, while still images may be photographed at constant time intervals in the POV camera 10. Upon pressing again of the recording start/stop button, the motion picture photographing of the imaging device 100 may be stopped, while the still image photographing may be stopped in the POV camera 10.

(Switching of Modes)

The input unit 116 of the imaging device 100, specifically the touch panel 116E, may accept an operation of the switching of the modes of the POV camera 10. The operation may be accepted in advance before photographing, or may be accepted not only before photographing but also during photography.

Based on the operation thus accepted, the input unit 116 may generate the instruction input signal of POV camera mode switching, i.e., the instruction input signal of the switching of the modes of the POV camera 10. The instruction input signal of POV camera mode switching, may be inputted to the communication unit 118. The communication unit 118 may transmit the instruction input signal of POV camera mode switching, to the communication unit 18 of the POV camera 10.

The communication unit 18 of the POV camera 10 may receive the instruction input signal of POV camera mode switching, from the communication unit 118 of the imaging device 100. The communication unit 18 may input, to the CPU 15, the instruction input signal thus received. The indicator unit 19 may provide indication of the mode thus determined, with characters or icons.

(Storage)

As described above, basically, the image data D10 generated by the POV camera 10 may be stored in the memory card 14A of the POV camera 10. Furthermore, in the imaging system 1, it is possible to allow the image data D10 generated by the POV camera 10 to be stored in the memory card 114A of the imaging device 100. Description thereof is given below.

The input unit 116 of the imaging device 100, specifically the touch panel 116E, may accept an operation of storage of the image data D10 generated by the POV camera 10. The operation may be accepted in advance before photographing, or may be accepted not only before photographing but also during photography.

Based on the operation thus accepted, the input unit 116 may generate the instruction input signal of POV camera data storage, i.e., the instruction input signal of storage of the image data D10 generated by the POV camera 10. The instruction input signal of POV camera data storage may be inputted to the communication unit 118. The communication unit 118 may transmit the instruction input signal of POV camera data storage to the communication unit 18 of the POV camera 10.

The communication unit 18 of the POV camera 10 may receive the instruction input signal of POV camera data storage, from the communication unit 118 of the imaging device 100. The communication unit 18 may input, to the CPU 15, the instruction input signal thus received. Under the control of the CPU 15, the image data D10 generated by the POV camera 10 may be supplied from the image processing unit 13 to the communication unit 18, and may be transmitted from the communication unit 18 to the communication unit 118 of the imaging device 100.

The communication unit 118 of the imaging device 100 may receive the image data D10 generated by the POV camera 10, from the communication unit 18 of the POV camera 10. The R/W 114 may write, in the memory card 114A, the image data D10 received by the communication unit 118.

At this occasion, the image processing unit 13 of the POV camera 10 may perform, on the image data D10 generated by the POV camera 10, conversion processing to reduce resolution, so as to reduce an amount of transferred information.

(Image-Display)

As described above, in the POV camera 10, the indicator unit 19 has no function of image-display; no image-display of the image signal and the image data D10 generated by the imaging unit 11 is provided. However, in the imaging system 1, it is possible to allow the display unit 120 of the imaging device 100 to provide image-display of the image signal and the image data D10 generated by the POV camera 10. Description thereof is given below.

The input unit 116 of the imaging device 100, specifically the touch panel 116E, may accept an operation of image-display of the image signal and the image data D10 generated by the POV camera 10. The operation may be accepted in advance before photographing, or may be accepted not only before photographing but also during photography.

Based on the operation thus accepted, the input unit 116 may generate the instruction input signal of POV camera image-display, i.e., the instruction input signal of image-display of the image signal and the image data D10 generated by the POV camera 10. The instruction input signal of POV camera image-display may be inputted to the communication unit 118. The communication unit 118 may transmit the instruction input signal of POV camera image-display, to the communication unit 18 of the POV camera 10.

The communication unit 18 of the POV camera 10 may receive the instruction input signal of POV camera image-display, from the communication unit 118 of the imaging device 100. The communication unit 18 may input, to the CPU 15, the instruction input signal thus received. Under the control of the CPU 15, the image signal and the image data D10 generated by the POV camera 10 may be transmitted from the communication unit 18 to the communication unit 118 of the imaging device 100.

The communication unit 118 of the imaging device 100 may receive, from the communication unit 18 of the POV camera 10, the image signal and the image data D10 generated by the POV camera 10. The display unit 120 may provide image-display of the image signal and the image data D10 received by the communication unit 118 (refer to FIG. 3).

(Simultaneous Display and Screen Allocation)

The input unit 116 of the imaging device 100, specifically the touch panel 116E, may accept an operation of allowing the display unit 120 to provide image-display of the image signal and the image data D10 generated by the POV camera 10, simultaneously with the image signal and the image data D100 generated by the imaging unit 111. The operation may be accepted in advance before photographing, or may be accepted not only before photographing but also during photography.

Figure 8:
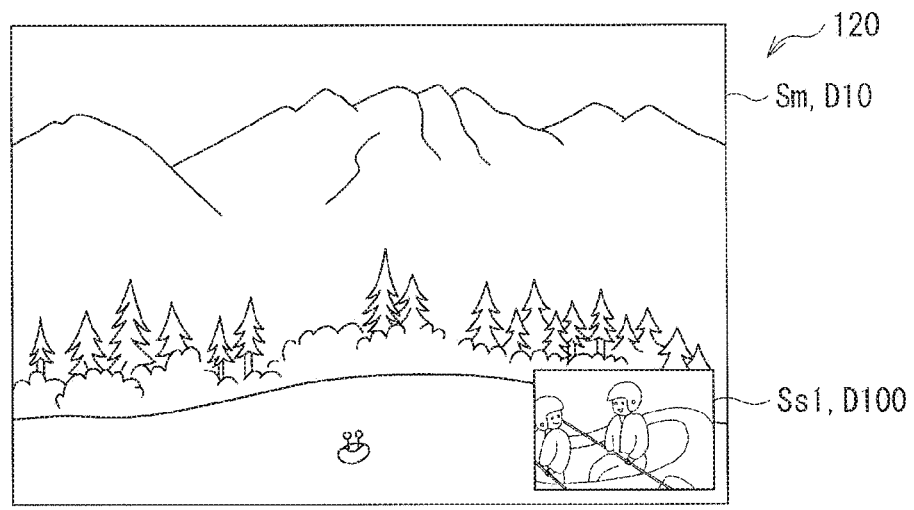
FIG. 8 is a diagram of one example of image-display provided by a display unit of the imaging device illustrated in FIG. 1.
Figure 9:
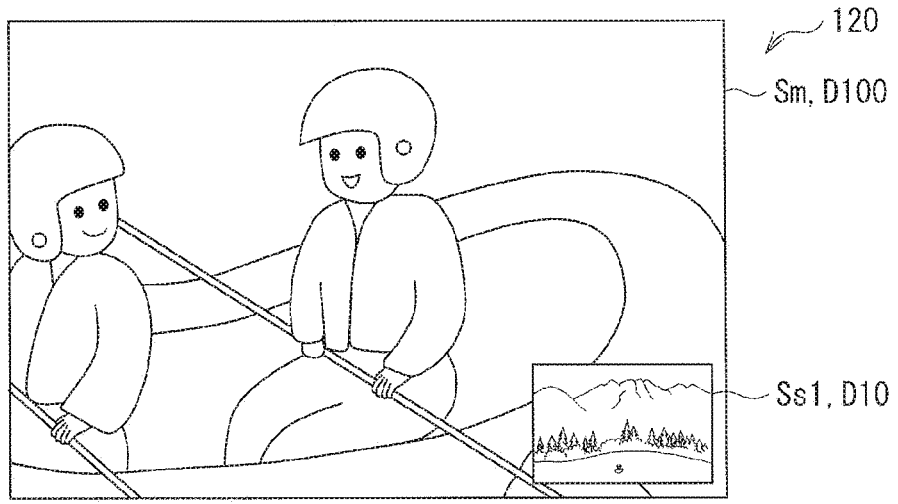
FIG. 9 is a diagram of one example of image-display provided by the display unit of the imaging device illustrated in FIG. 1.

Specifically, the display unit 120 is configured to simultaneously display a main screen Sm and one sub screen Ss1, as illustrated in FIGS. 8 and 9. The main screen Sm may correspond to, for example, all of the display unit 120. The sub screen Ss1 may correspond to part of the display unit 120.

In accordance therewith, the input unit 116, specifically the touch panel 116E, may accept an operation of allocation of the main screen Sm and the sub screen Ss1 to the image signal and the image data D10 generated by the POV camera 10, and to the image signal and the image data D100 generated by the imaging device 100. The operation may be accepted in advance before photographing, or may be accepted not only before photographing but also during photography.

Based on the operation thus accepted, the input unit 116 may generate the instruction input signal of simultaneous display and the instruction input signal of screen allocation. The instruction input signal of simultaneous display may include allowing the display unit 120 to provide image-display of the image signal and the image data D10 generated by the POV camera 10, simultaneously with the image signal and the image data D100 generated by the imaging device 100. The instruction input signal of screen allocation may include allocation of the main screen Sm and the sub screen Ss1 to the image signal and the image data D10 generated by the POV camera 10, and to the image signal and the image data D100 generated by the imaging device 100.

The instruction input signal of simultaneous display may be inputted to the communication unit 118. The communication unit 118 may transmit the instruction input signal of simultaneous display, to the communication unit 18 of the POV camera 10.

The communication unit 18 of the POV camera 10 may receive the instruction input signal of simultaneous display, from the communication unit 118 of the imaging device 100. The communication unit 18 may input the instruction input signal thus received, to the CPU 15. Under the control of the CPU 15, the image signal and the image data D10 generated by the POV camera 10 may be supplied from the image processing unit 13 to the communication unit 18, and may be transmitted from the communication unit 18 to the communication unit 118 of the imaging device 100.

The communication unit 118 of the imaging device 100 may receive the image signal and the image data D10 generated by the POV camera 10, from the communication unit 18 of the POV camera 10.

The instruction input signal of screen allocation may be inputted to the CPU 115. Under the control of the CPU 115, the display unit 120 may allocate the main screen Sm and the sub screen Ss1 to the image signal and the image data D10 received by the communication unit 118, and to the image signal and the image data D100 generated by the imaging device 100, and may provide simultaneous image-display.

Specifically, in the photographing standby state, the display unit 120 may allocate the main screen Sm and the sub screen Ss1 to the image signal generated by the POV camera 10, and to the image signal generated by the imaging device 100, and may provide simultaneous image-display, as the through-the-lens image. The through-the-lens image may be also displayed on the view finder 122. During photography and playback, the display unit 120 may allocate the main screen Sm and the sub screen Ss1 to the image data D10 generated by the POV camera 10, and to the image data D100 generated by the imaging device 100, and may provide simultaneous image-display.

Assume that the main screen Sm is allocated to the image signal and the image data D10 generated by the POV camera 10, and the sub screen Ss1 is allocated to the image signal and the image data D100 generated by the imaging device 100. In this case, as illustrated in FIG. 8, the image signal and the image data D10 (refer to FIG. 3) generated by the POV camera 10 may be displayed on the main screen Sm, and the image signal and the image data D100 (refer to FIG. 4) generated by the imaging device 100 may be displayed on the sub screen Ss1.

Assume that the main screen Sm is allocated to the image signal and the image data D100 generated by the imaging device 100, and the sub screen Ss1 is allocated to the image signal and the image data D10 generated by the POV camera 10. In this case, as illustrated in FIG. 9, the image signal and the image data D100 (refer to FIG. 4) generated by the imaging device 100 may be displayed on the main screen Sm, and the image signal and the image data D10 (refer to FIG. 3) generated by the POV camera 10 may be displayed on the sub screen Ss1.

Figure 10:
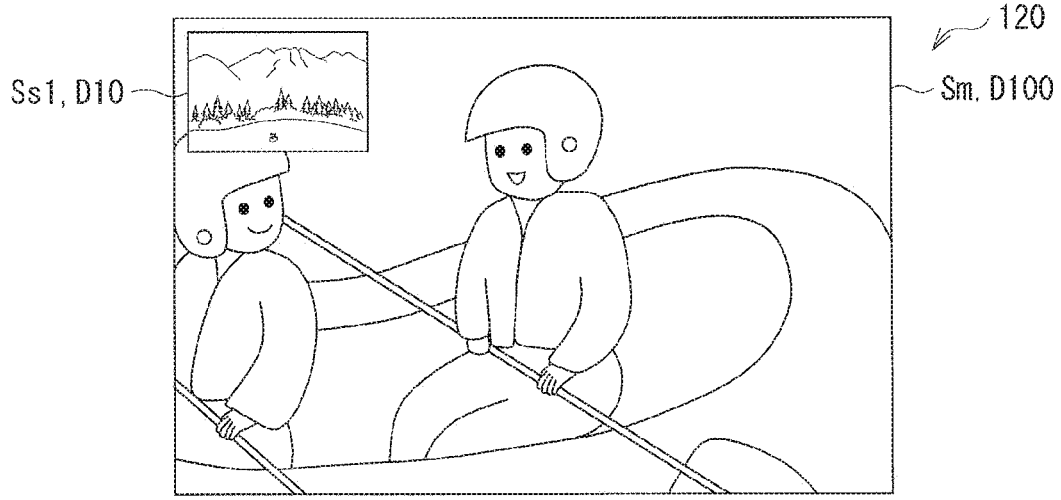
FIG. 10 is a diagram of one example of image-display provided by the display unit of the imaging device illustrated in FIG. 1.

A position of the sub screen Ss1 on the display unit 120 may be changed inside the display unit 120, as illustrated in FIG. 10.

The image processing unit 13 of the POV camera 10 may adjust, based on the allocation, resolution of the image signal and the image data D10 generated by the POV camera 10. Specifically, when the main screen Sm is allocated to the image signal and the image data D10 generated by the POV camera 10 (refer to FIG. 8), the image processing unit 13 may increase resolution to allow for clear display. When the sub screen Ss1 is allocated to the image signal and the image data D10 generated by the POV camera 10 (refer to FIG. 9), the image processing unit 13 may decrease resolution to reduce the amount of transferred information. The adjustment of resolution may be carried out in consideration of balance between the clear display and reduction in the amount of transferred information.

As described, in the embodiment, the POV camera 10 includes the imaging unit 11, the body 21, and the communication unit 18. The body 21 is configured to selectively form a mechanical coupling to one of the surfboard, the bicycle, and the imaging device 100. The communication unit 18 is configured to communicate wirelessly with the imaging device 100. Thus, the POV camera 10 is mechanically unified with the imaging device 100; each performs photographing, while allowing various operations to be performed in conjunction with one another, interactively or in synchronization with one another. Hence, it is possible to use the POV camera 10 in combination with the imaging device 100 that is different in kind or category from a POV camera, allowing for more diverse styles of photographing of the POV camera 10.

In other words, the POV camera 10 includes the imaging unit 11, the body 21, and the communication unit 18. The imaging unit 11 performs photographing with use of the lens 11A having the first angle of view α1. The body 21 is configured to be mechanically coupled to the imaging device 100 that performs photographing with use of the lens 111A having the second angle of view α2 that is smaller than the first angle of view α1. The communication unit 18 is configured to communicate wirelessly with the imaging device 100. Thus, the POV camera 10 is mechanically unified with the imaging device 100; each performs photographing with different angles of view (photographing with the first angle of view α1 and photographing with the second angle of view α2), while allowing various operations to be performed in conjunction with one another, interactively or in synchronization with one another. Hence, it is possible to use the POV camera 10 in combination with the imaging device 100 different in the angle of view α2 of the lens 111A, allowing for more diverse styles of photographing of the POV camera 10.

In other words, the POV camera 10 includes the imaging unit 11, the body 21, and the communication unit 18. The imaging unit 11 generates the image signal and the image data D10. The body 21 is configured to be mechanically coupled to the imaging device 100 that includes the display unit 120 that provides image-display. The communication unit 18 is configured to communicate wirelessly with the imaging device 100. The POV camera 10 includes no display unit that provides image-display of the image signal and the image data D10 generated by the imaging unit 11. Thus, the POV camera 10 is mechanically unified with the imaging device 100; each performs photographing, while allowing various operations to be performed in conjunction with one another, interactively or in synchronization with one another. The various operations include image-display of the image signal and the image data D10. Hence, it is possible to use the POV camera 10 in combination with the imaging device 100 different in an image-display function, allowing for more diverse styles of photographing of the POV camera 10.

In the embodiment, the imaging device 100 includes the imaging unit 111, the body 121, and the communication unit 118. The body 121 is configured to be mechanically coupled to the POV camera 10 that is configured to selectively form a mechanical coupling to one of the surfboard, the bicycle, and the imaging device 100. The communication unit 118 is configured to communicate wirelessly with the POV camera 10. Thus, the imaging device 100 is mechanically unified with the POV camera 10, each performs photographing, while allowing various operations to be performed in conjunction with one another, interactively or in synchronization with one another. Hence, it is possible to use the imaging device 100 in combination with the POV camera 10, allowing for more diverse styles of photographing of the POV camera 10.

Moreover, the communication unit 18 is configured to receive the instruction input signal from the communication unit 118 of the imaging device 100. The instruction input signal may be generated based on the operation of the POV camera 10 accepted by the input unit 116 of the imaging device 100. Hence, it is possible to perform various operations such as the zooming, the synchronous photographing, and the mode switching, in conjunction between the POV camera 10 and the imaging device 100.

Furthermore, the communication unit 18 is configured to transmit the image data D10 generated by the POV camera 10, to the communication unit 118 of the imaging device 100, to allow the image data D10 to be stored in the memory card 114A of the imaging device 100. Hence, it is possible to expand a function of image data storage of the POV camera 10, leading to enhancement in convenience of the POV camera 10.

In addition, the communication unit 18 is configured to transmit the image signal and the image data D10 generated by the POV camera 10, to the communication unit 118 of the imaging device 100, to allow the display unit 120 of the imaging device 100 to provide image-display of the image signal and the image data D10. This allows for image-display of the image signal and the image data D10 generated by the POV camera 10, even in a case in which the indicator unit 19 of the POV camera 10 does not perform image-display. Hence, it is possible to enhance convenience of the POV camera 10.

(Second Embodiment)

Figure 11:
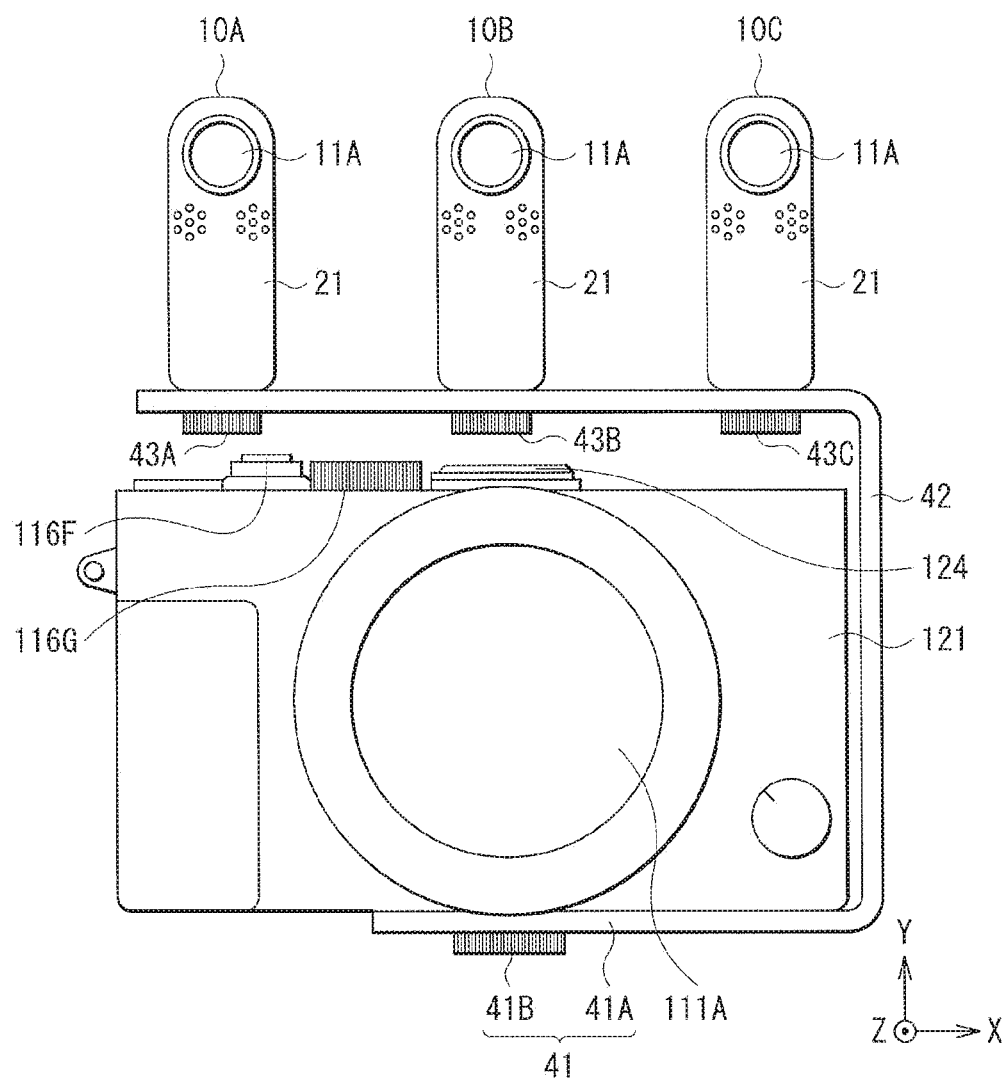
FIG. 11 is a front view of an application example of an imaging system that includes POV cameras and an imaging device according to a second embodiment of the disclosure.
Figure 12:
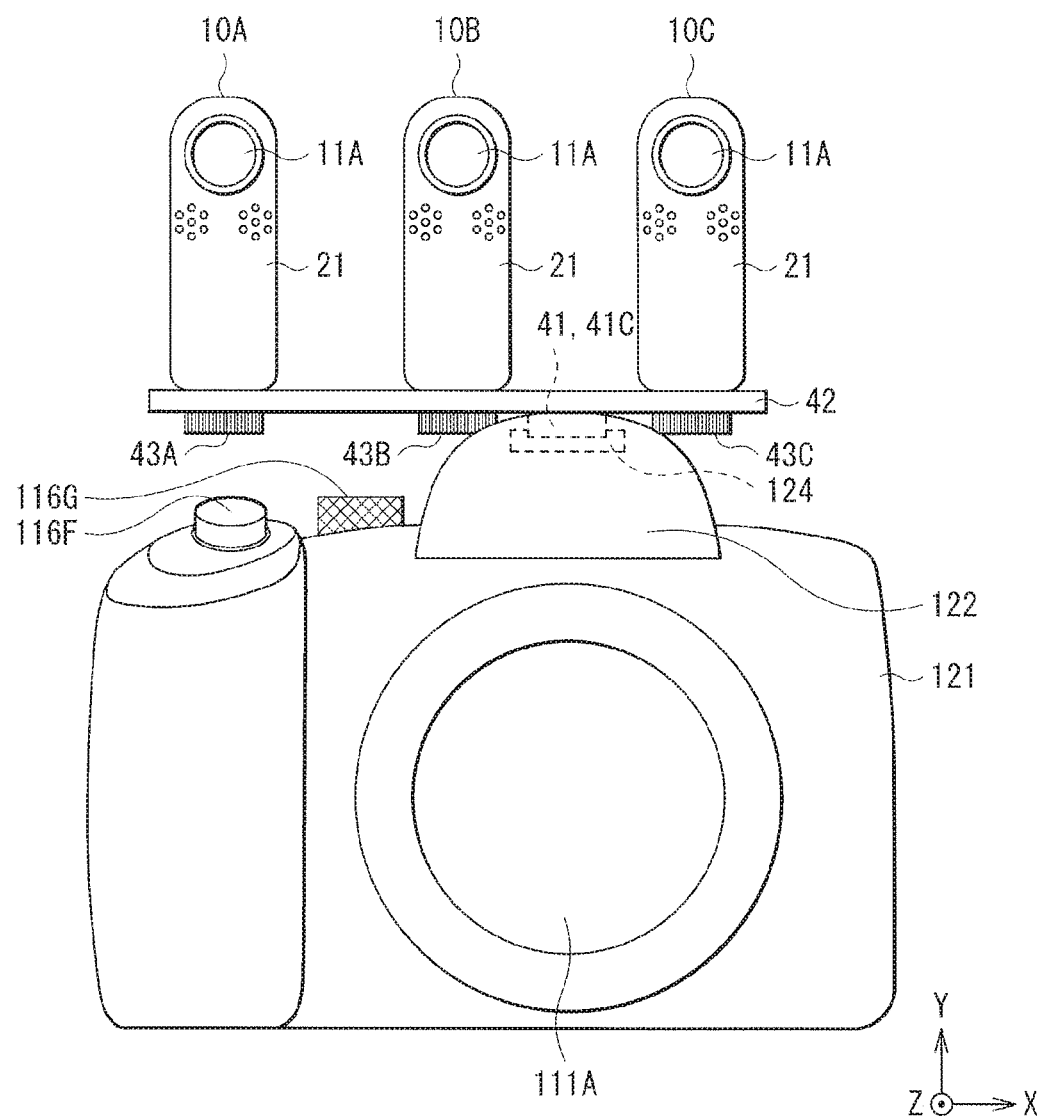
FIG. 12 is a front view of another application example of the imaging system.

FIGS. 11 and 12 illustrate application examples of an imaging system 2 according to a second embodiment of the disclosure. In the imaging system 2, as illustrated in FIG. 1, a plurality of (e.g., three) POV cameras 10A to 10C are mechanically coupled to the imaging device 100, and are configured to communicate wirelessly with the imaging device 100. Otherwise, the imaging system 2 may have similar configurations, workings, and effects to those of the forgoing first embodiment. Accordingly, description is given with corresponding components denoted by same references.

[Configuration Example]

The plurality of POV cameras 10A to 10C each may have a similar configuration to that of the POV camera 10 as described in the first embodiment with reference to FIGS. 1 and 2. An upper limit of the number of the plurality of the POV cameras 10A to 10C may vary according to processing capacity of the CPU 115 of the imaging device 100, and may be, for example, five or six.

In an example illustrated in FIG. 11, the imaging device 100 may be a compact digital camera. The lens 111A may be provided in a front surface of the body 121. A shutter button 116F and a mode dial 116G of the input unit 116, and the shoe 124 may be provided in a top surface of the body 121. The display unit 120, although not illustrated in FIG. 11, may be provided on a back surface of the body 121. On a screen of the display unit 120, although not illustrated in FIG. 11, the touch panel 116E of the input unit 116 may be provided. Note that arrangement of these components on the body 121 is not limited to the example as mentioned above.

In an example illustrated in FIG. 12, the imaging device 100 may be a lens-interchangeable digital camera. The lens 111A may be attached to a mount 127 provided in a front surface of the body 121. The shutter button 116F and the mode dial 116G of the input unit 116, the view finder 122, and the shoe 124 may be provided in a top surface of the body 121. Note that arrangement of these components on the body 121 is not limited to the example as mentioned above.

Otherwise, the imaging device 100 illustrated in FIGS. 11 and 12 may have similar configurations to that of the imaging device 100 as described in the first embodiment with reference to FIGS. 1 and 2.

Figure 13A:
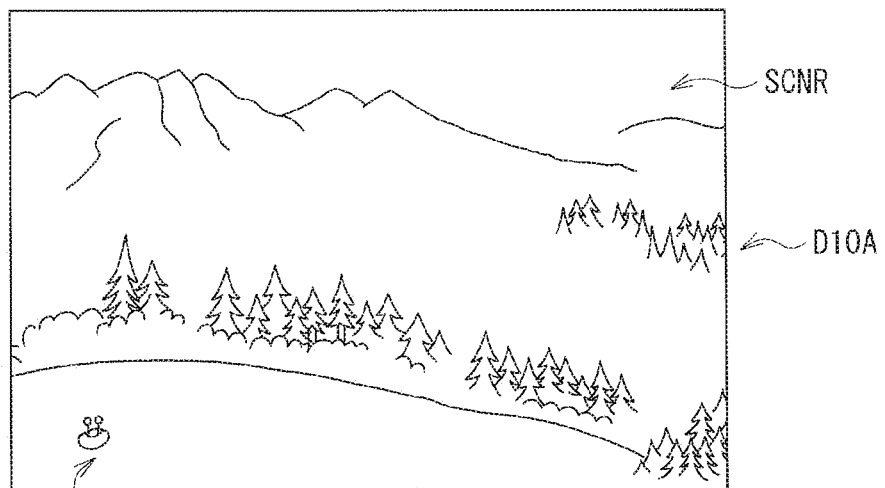
FIG. 13A is a diagram of one example of image data generated by the POV camera illustrated in FIG. 11.
Figure 13B:
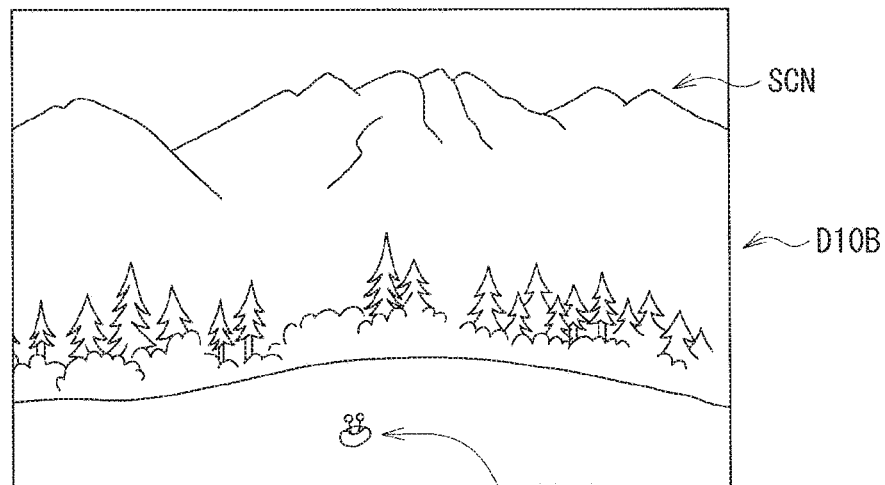
FIG. 13B is a diagram of one example of image data generated by the POV camera illustrated in FIG. 11.
Figure 13C:
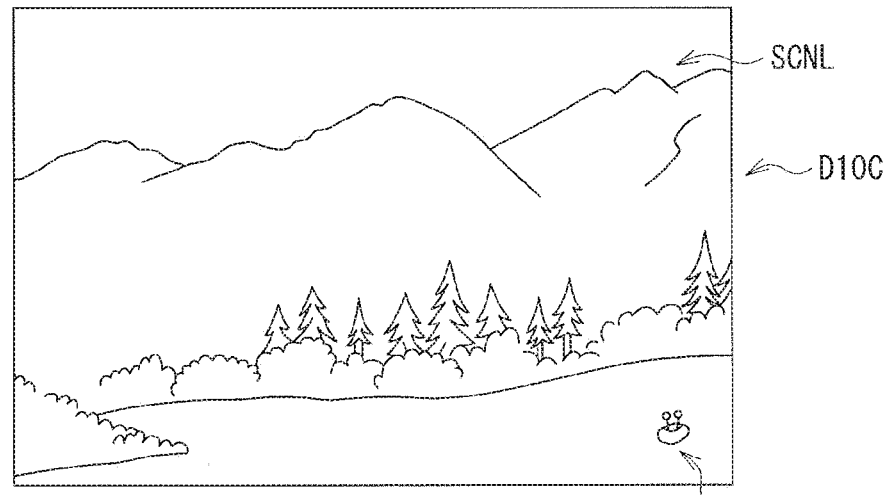
FIG. 13C is a diagram of one example of image data generated by the POV camera illustrated in FIG. 11.

FIGS. 13A to 13C illustrate examples of image data D10A to D10C generated by the plurality of POV cameras 10A to 10C. As illustrated in FIG. 13A, the image data D10A generated by the POV camera 10A may include, for example, background scenery SCNR on the right side, in addition to the object, e.g., the canoe CN, and its occupants OCP1 and OCP2. As illustrated in FIG. 13B, the image data D10B generated by the POV camera 10B may include, for example, the background scenery SCN, in addition to the object, e.g., the canoe CN, and its occupants OCP1 and OCP2. As illustrated in FIG. 13C, the image data D10C generated by the POV camera 10C may include, for example, background scenery SCNL on the left side, in addition to the object, e.g., the canoe CN, and its occupants OCP1 and OCP2.

Figure 14:
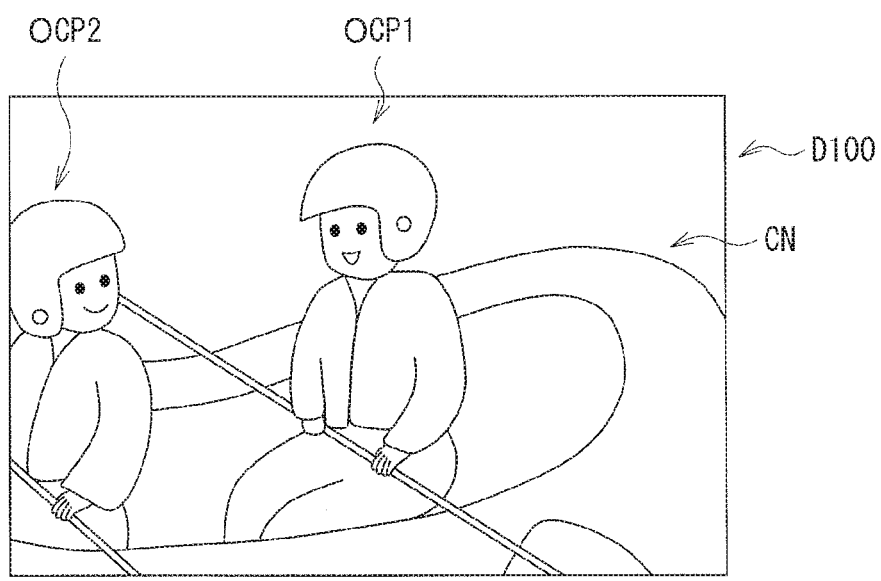
FIG. 14 is a diagram of one example of image data generated by the imaging device illustrated in FIG. 11.

FIG. 14 illustrates an example of the image data D100 generated by the imaging device 100. The image data D100 may include, in a close-up manner, for example, the object, e.g., the canoe CN, and its occupants OCP1 and OCP2.

(Coupling Relation Between Imaging Device 100 and Plurality of POV Cameras 10A to 10C)

The imaging device 100 includes the imaging unit 111, the body 121, and the communication unit 118. The body 121 is configured to be mechanically coupled to the plurality of POV cameras 10A to 10C that each are configured to selectively form a mechanical coupling to one of the surfboard, the bicycle, and the imaging device 100. The communication unit 118 is configured to communicate wirelessly with the plurality of POV cameras 10A to 10C.

Here, similarly to the first embodiment, the term "selectively" refers to being mechanically coupled to one or more selected from the surfboard, the bicycle, and the imaging device 100, because the POV cameras 10A to 10C are generally not mechanically coupled, at same time, to the surfboard, the bicycle, and the imaging device 100.

Note that objects of the selective mechanical coupling of the POV cameras 10A to 10C are not limited to the three as described above. Preferred but non-limiting examples may include vehicles on land, a surfboard, a sports board such as a snowboard, sports equipment used in, for example, skiing, vessels on water, a body of a human or a pet animal, and accessories therefor. Preferred but non-limiting examples of the vehicles on land may include two-wheeled vehicles such as a bicycle and a motorbike, and four-wheeled vehicles such as an automobile. Preferred but non-limiting examples of the vessels on water may include a boat such as a yacht and a kayak.

In other words, the imaging device 100 includes the imaging unit 111, the body 121, and the communication unit 118. The imaging unit 111 performs photographing with use of the lens 111A having the second angle of view α2. The body 121 is configured to be mechanically coupled to the plurality of POV cameras 10A to 10C that each are configured to selectively form a mechanical coupling to one of the surfboard, the bicycle, and the imaging device 100. The communication unit 118 is configured to communicate wirelessly with the plurality of POV cameras 10A to 10C.

In other words, the imaging device 100 includes the imaging unit 111, the display unit 120, the body 121, and the communication unit 118. The display unit 120 provides image-display. The body 121 is configured to be mechanically coupled to the plurality of POV cameras 10A to 10C that generate the image signals and the image data D10A to D10C but include no display unit that provides image-display of the image signals and the image data D10A to D10C generated. The communication unit 118 is configured to communicate wirelessly with the plurality of POV cameras 10A to 10C.

With these configurations, in the imaging device 100, it is possible to use the imaging device 100 in combination with the plurality of POV cameras 10A to 10C, allowing for more diverse styles of photographing of the plurality of POV cameras 10A to 10C.

(Intermediate Member 40)

As illustrated in FIGS. 11 and 12, for example, the body 121 of the imaging device 100 is configured to be mechanically coupled to the plurality of POV cameras 10A to 10C with an intermediate member 40 in between. For example, as illustrated in FIG. 11, the intermediate member 40 may include a coupling part 41, an extension part 42, and a plurality of (e.g., three) tripod screws 43A, 43B, and 43C. The coupling part 41 may be a part configured to be mechanically coupled to the body 121, and may include, for example, a plate 41A made of a steel plate, and a tripod screw 41B. The tripod screw 41B may be fixed to a bottom surface of the body 121 with the plate 41A in between. The extension part 42 may be made of a steel plate that is extended from the plate 41A of the coupling part 41 along the body 121. The plurality of tripod screws 43A to 43C may be provided on the extension part 42 and configured to be fastened to the plurality of POV cameras 10A to 10C. Note that the number of the plurality of tripod screws 43A to 43C may be equal to, or different from the number of the plurality of POV cameras 10A to 10C.

Alternatively as illustrated in FIG. 12, the coupling part 41 may include a foot 41C configured to be fitted in the shoe 124 of the body 121 of the imaging device 100.

[Operation and Workings]

Description is given next on operation and workings of the imaging system 2 according to the embodiment.

(Single Operation of Plurality of POV Cameras 10A to 10C and Imaging Device 100)

Operation of each of the plurality of POV cameras 10A to 10C may be similar to that of the POV camera 10 as described in the first embodiment. Operation of the imaging device 100 may be similar to that of the imaging device 100 as described in the first embodiment.

(Cooperative Operation of Plurality of POV Cameras 10A to 10C and Imaging Device 100)

In the embodiment, furthermore, the communication units 18 and 118 may allow various operations to be performed between the plurality of POV cameras 10A to 10C and the imaging device 100 in conjugation with one another, interactively or in synchronization with one another.

For example, the input unit 116 of the imaging device 100 may accept an operation of one or more relevant POV cameras 10N out of the plurality of POV cameras 10A to 10C.

In this example, the one or more relevant POV cameras 10N may be any one of the following combinations: {10A to 10C}, {10A and 10B}, {10A and 10C}, {10B and 10C}, {10A}, {10B}, and {10C}.

Based on the operation thus accepted, the input unit 116 may generate the instruction input signal. The communication unit 118 of the imaging device 100 may transmit the instruction input signal thus generated, to the communication units 18 of the one or more relevant POV cameras 10N involved in the operation.

The communication units 18 of the one or more relevant POV cameras 10N may receive the instruction input signal thus generated, from the communication unit 118 of the imaging device 100.

The instruction input signal regarding the one or more relevant POV cameras 10N may include, for example, one or more of zooming in the one or more relevant POV cameras 10N, execution of photographing of the one or more relevant POV cameras 10N in synchronization with the photographing of the imaging device 100, switching of the modes of the one or more relevant POV cameras 10N, storage of the image data D10N generated by the one or more relevant POV cameras 10N, and image-display of the image signals and the image data D10N generated by the one or more relevant POV cameras 10N.

In this example, the image data D10N may be any one of the following combinations: {D10A to D10C}, {D10A and D10B}, {D10A and D10C}, {D10B and D10C}, {D10A}, {D10B}, and {D10C}.

In the following, description is given on details of each case.

(Zooming)

The input unit 116 of the imaging device 100, specifically the zoom lever 116D, may accept an operation of zooming in the one or more relevant POV cameras 10N in synchronization with the zooming in the imaging device 100. The operation may be accepted in advance before photographing, or may be accepted not only before photographing but also during photography.

Based on the operation thus accepted, the input unit 116 may generate the instruction input signal of POV camera zooming, i.e., the instruction input signal of the zooming in the one or more relevant POV cameras 10N. The instruction input signal of POV camera zooming may be inputted to the communication unit 118. The communication unit 118 may transmit the instruction input signal of POV camera zooming, to the communication units 18 of the one or more relevant POV cameras 10N.

The communication units 18 of the one or more relevant POV cameras 10N may receive the instruction input signal of POV camera zooming, from the communication unit 118 of the imaging device 100. The communication units 18 may input, to the CPUs 15, the instruction input signal thus received. Under the control of the CPUs 15, the image processing units 13 may perform, for example, digital zooming.

(Synchronous Photographing)

The input unit 116 of the imaging device 100, specifically the shutter button 116F may accept an operation of the execution of photographing of the one or more relevant POV cameras 10N in synchronization with the photographing of the imaging device 100.

Based on the operation thus accepted, the input unit 116 may generate the instruction input signal of synchronous photographing, i.e., the instruction input signal of the execution of photographing of the one or more relevant POV cameras 10N in synchronization with the photographing of the imaging device 100. The instruction input signal of synchronous photographing may be inputted to the communication unit 118. The communication unit 118 may transmit the instruction input signal of synchronous photographing, to the communication units 18 of the one or more relevant POV cameras 10N.

The communication units 18 of the one or more relevant POV cameras 10N may receive the instruction input signal of synchronous photographing, from the communication unit 118 of the imaging device 100. The communication units 18 may input, to the CPUs 15, the instruction input signal thus received. Under the control of the CPUs 15, the imaging units 11 may perform photographing in synchronization with the photographing of the imaging device 100. The photographing in synchronization with the photographing of the imaging device 100 may be carried out in accordance with the four modes in a similar manner to the first embodiment.

(Switching of Modes)

The input unit 116 of the imaging device 100, specifically the mode dial 116G or the touch panel 116E, may accept an operation of the switching of the modes of the one or more relevant POV cameras 10N. The operation may involve setting all of the one or more relevant POV cameras 10N to a same mode, or may involve setting part or all of the one or more relevant POV cameras 10N to different modes. The operation may be accepted in advance before photographing, or may be accepted not only before photographing but also during photography.

Based on the operation thus accepted, the input unit 116 may generate the instruction input signal of POV camera mode switching, i.e., the instruction input signal of the switching of the modes of the one or more relevant POV cameras 10N. The instruction input signal of POV camera mode switching may be inputted to the communication unit 118. The communication unit 118 may transmit the instruction input signal of POV camera switching, to the communication units 18 of the one or more relevant POV cameras 10N.

The communication units 18 of the one or more relevant POV cameras 10N may receive the instruction input signal of POV camera mode switching, from the communication unit 118 of the imaging device 100. The communication units 18 may input, to the CPUs 15, the instruction input signal thus received. The indicator unit 19 may provide indication of the mode thus determined, with characters or icons.

(Storage)

As described above, basically, the image data D10A to D10C generated by the plurality of POV cameras 10A to 10C may be stored in the memory cards 14A of the plurality of POV cameras 10A to 10C. Furthermore, in the imaging system 2, it is possible to allow the image data D10A to D10C generated by the plurality of POV cameras 10A to 10C to be stored in the memory card 114A of the imaging device 100. Description thereof is given below.

The input unit 116 of the imaging device 100, specifically the touch panel 116E, may accept an operation of storage of the image data D10N generated by the one or more relevant POV cameras 10N out of the plurality of POV cameras 10A to 10C. The operation may be accepted in advance before photographing, or may be accepted not only before photographing but also during photography.

Based on the operation thus accepted, the input unit 116 may generate the instruction input signal of POV camera data storage, i.e., the instruction input signal of storage of the image data D10N generated by the one or more relevant POV cameras 10N. The instruction input signal of POV camera data storage may be inputted to the communication unit 118. The communication unit 118 may transmit the instruction input signal of POV camera data storage, to the communication units 18 of the one or more relevant POV cameras 10N.

The communication units 18 of the one or more relevant POV cameras 10N may receive the instruction input signal of POV camera data storage, from the communication unit 118 of the imaging device 100. The communication units 18 may input, to the CPUs 15, the instruction input signal thus received. Under the control of the CPUs 15, the image data D10N generated by the one or more relevant POV cameras 10N may be supplied from the image processing unit 13 to the communication unit 18, and may be transmitted from the communication units 18 to the communication unit 118 of the imaging device 100.

The communication unit 118 of the imaging device 100 may receive the image data D10N generated by the one or more relevant POV cameras 10N, from the communication units 18 of the one or more relevant POV cameras 10N. The R/W 114 may write, in the memory card 114A, the image data D10N received by the communication unit 118.

At this occasion, the image processing units 13 of the plurality of POV cameras 10A to 10C may perform, on the image data D10N generated by the one or more relevant POV cameras 10N, conversion processing to reduce resolution, so as to reduce an amount of transferred information.

(Image-Display)

As described above, in the plurality of POV cameras 10A to 10C, the indicator units 19 have no function of image-display; no image-display of the image signal and the image data D10A to D10C generated by the plurality of POV cameras 10A to 10C is provided. However, in the imaging system 2, it is possible to allow the display unit 120 of the imaging device 100 to provide image-display of the image signal and the image data D10A to D10C generated by the plurality of POV cameras 10A to 10K. Description thereof is given below.

The input unit 116 of the imaging device 100, specifically the touch panel 116E, may accept an operation of image-display of the image signals and the image data D10N generated by the one or more relevant POV cameras 10N out of the plurality of POV cameras 10A to 10C. The operation may be accepted in advance before photographing, or may be accepted not only before photographing but also during photography.

Based on the operation thus accepted, the input unit 116 may generate the instruction input signal of POV camera image-display, i.e., the instruction input signal of image-display of the image signals and the image data D10N generated by the one or more relevant POV cameras 10N. The instruction input signal of POV camera image-display may be inputted to the communication unit 118. The communication unit 118 may transmit the instruction input signal of POV camera image-display, to the communication units 18 of the one or more relevant POV cameras 10N.

The communication units 18 of the one or more relevant POV cameras 10N may receive the instruction input signal of POV camera image-display, from the communication unit 118 of the imaging device 100. The communication units 18 may input, to the CPUs 15, the instruction input signal thus received. Under the control of the CPUs 15, the image signals and the image data D10N generated by the one or more relevant POV cameras 10N may be transmitted from the communication units 18 to the communication unit 118 of the imaging device 100.

The communication unit 118 of the imaging device 100 may receive, from the communication units 18 of the one or more relevant POV cameras 10N, the image signals and the image data D10N generated by the one or more relevant POV cameras 10N. The display unit 120 may provide image-display of the image signals and the image data D10N received by the communication unit 118 (refer to FIGS. 13A to 13C).

(Simultaneous Display and Screen Allocation)

The input unit 116 of the imaging device 100, specifically the touch panel 116E, may accept an operation of allowing the display unit 120 to provide image-display of the image signals and the image data D10N generated by the one or more relevant POV cameras 10N, simultaneously with the image signal and the image data D100 generated by the imaging unit 111. The operation may be accepted in advance before photographing, or may be accepted not only before photographing but also during photography.

Specifically, the display unit 120 is configured to simultaneously display the main screen Sm, and one or more sub screens Ss1 to Ss3 (hereinafter collectively referred to as sub screens Ss), as illustrated in FIGS. 15A to 15C, 16, 17, 18, and 19. The main screen Sm may correspond to, for example, all of the display unit 120. The sub screens Ss1 to Ss3 may each correspond to, for example, part of the display unit 120. The number of the sub screens Ss1 to Ss3 may vary depending of processing capacity of the CPU 115 of the imaging device 100, and may be, for example, five or six.

In accordance therewith, the input unit 116, specifically the touch panel 116E, may accept an operation of formation of a camera group that includes two or more selected from the one or more relevant POV cameras 10N and the imaging unit 111, and allocation of the main screen Sm and the sub screens Ss, to the image signals and the image data D10M generated by the two or more involved in the camera group. The operation may be accepted in advance before photographing, or may be accepted not only before photographing but also during photography.

In this example, the camera group may be any one of the following combinations: {10A to 10C and 111}, {10A to 10C}, {10A, 10B, and 111}, {10A, 10C, and 111}, {10B, 10C, and 111}, {10A and 10B}, {10A and 10C}, {10B and 10C}, {10A and 111}, {10B and 111}, and {10C and 111}.

In this example, the image data D10M may be any one of the following combinations: {D10A to D10C and D100}, {D10A to D10C}, {D10A, D10B, and D100}, {D10A, D10C, and D100}, {D10B, D10C, and D100}, {D10A and D10B}, {D10A and D10C}, {D10B and D10C}, {D10A and D100}, {D10B and D100}, and {D10C and D100}.

Based on the operation thus accepted, the input unit 116 may generate the instruction input signal of camera group formation for simultaneous display, and the instruction input signal of screen allocation. The instruction input signal of camera group formation may include formation of the camera group that includes two or more selected from the one or more relevant POV cameras 10N and the imaging unit 111. The instruction input signal of screen allocation may include allocation of the main screen Sm and the sub screens Ss to the image signals and image data D10M generated by the two or more involved in the camera group.

The instruction input signal of camera group formation may be inputted to the communication unit 118. The communication unit 118 may transmit the instruction input signal of camera group formation, to the communication units 18 of a POV camera or POV cameras 10CG involved in the camera group.

In this example, the POV camera or the POV cameras 10CG involved in the camera group may be any one of the following combinations: {10A to 10C}, {10A and 10B}, {10A and 10C}, {10B and 10C}, {10A}, {10B}, and {10C}.

The communication units 18 of the POV camera or the POV cameras 10CG involved in the camera group may receive the instruction input signal of camera group formation, from the communication unit 118 of the imaging device 100. The communication units 18 may input, to the CPUs 15, the instruction input signal thus received. Under the control of the CPUs 15, the image signals and the image data D10CG generated by the POV camera or the POV cameras 10CG involved in the camera group may be supplied from the image processing units 13 to the communication units 18, and may be transmitted from the communication units 18 to the communication unit 118 of the imaging device 100.

In this example, the image data D10CG may be any one of the following combinations: {D10A to D10C}, {D10A and D10B}, {D10A and D10C}, {D10B and D10C}, {D10A}, {D10B}, and {D10C}.

The communication unit 118 may receive the image signals and the image data D10CG generated by the POV camera or the POV cameras 10CG involved in the camera group, from the communication units 18.

The instruction input signal of screen allocation may be inputted to the CPU 115. Under the control of the CPU 115, the display unit 120 may allocate the main screen Sm and the sub screens Ss to the image signals and the image data D10M generated by the two or more involved in the camera group.

Specifically, in the photographing standby state, the display unit 120 may allocate the main screen Sm and the sub screens Ss to the image signals generated by the two or more involved in the camera group, and may provide simultaneous image-display, as the through-the-lens image. The through-the-lens image may be also displayed on the view finder 122. During photography and playback, the display unit 120 may allocate the main screen Sm and the sub screens Ss to the image data D10M, and may provide simultaneous image-display.

Figure 15A:
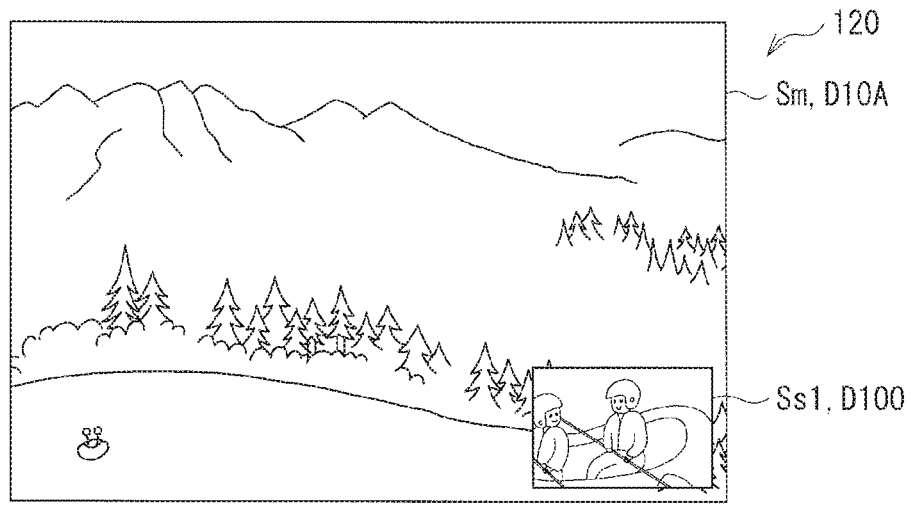
FIG. 15A is a diagram of one example of image-display provided by the display unit of the imaging device illustrated in FIG. 11.

Assume that the POV camera 10A and the imaging unit 111 are selected to form the camera group; the main screen Sm is allocated to the image signal and the image data D10A generated by the POV camera 10A; and the sub screen Ss1 is allocated to the image signal and the image data D100 generated by the imaging unit 111. In this case, as illustrated in FIG. 15A, the image signal and the image data D10A (refer to FIG. 13A) generated by the POV camera 10A may be displayed on the main screen Sm, and the image signal and the image data D100 (refer to FIG. 14) generated by the imaging unit 111 may be displayed on the sub screen Ss1.

Figure 15B:
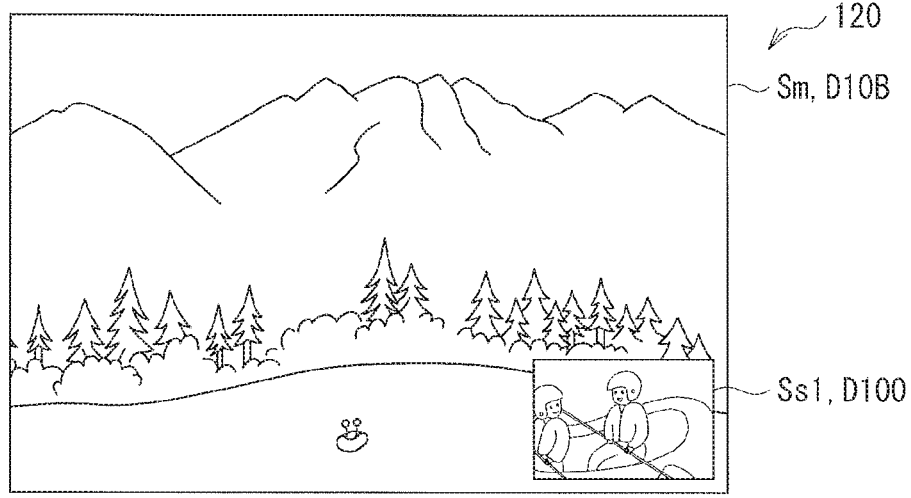
FIG. 15B is a diagram of one example of image-display provided by the display unit of the imaging device illustrated in FIG. 11.

Assume that the POV camera 10B and the imaging unit 111 are selected to form the camera group; the main screen Sm is allocated to the image signal and the image data D10B generated by the POV camera 10B; and the sub screen Ss1 is allocated to the image signal and the image data D100 generated by the imaging unit 111. In this case, as illustrated in FIG. 15B, the image signal and the image data D10B (refer to FIG. 13B) generated by the POV camera 10B may be displayed on the main screen Sm, and the image signal and the image data D100 (refer to FIG. 14) generated by the imaging unit 111 may be displayed on the sub screen Ss1.

Figure 15C:
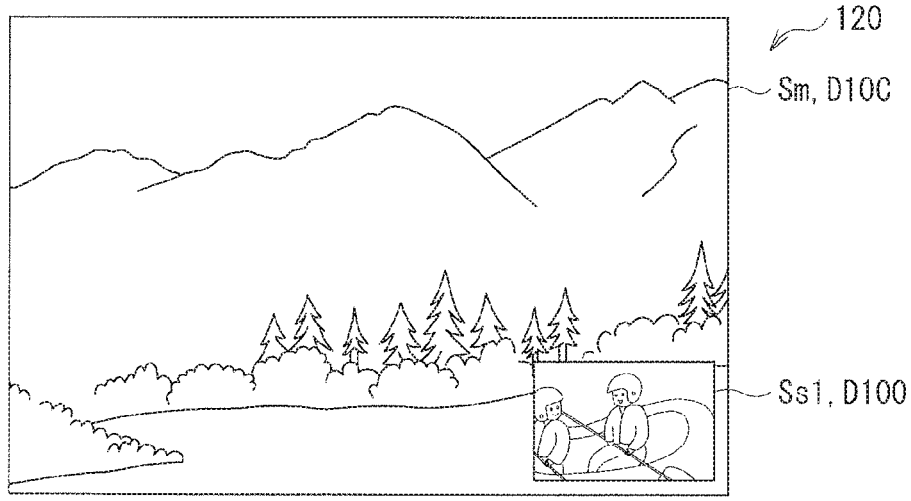
FIG. 15C is a diagram of one example of image-display provided by the display unit of the imaging device illustrated in FIG. 11.

Assume that the POV camera 10C and the imaging unit 111 are selected to form the camera group; the main screen Sm is allocated to the image signal and the image data D10C generated by the POV camera 10C; and the sub screen Ss1 is allocated to the image signal and the image data D100 generated by the imaging unit 111. In this case, as illustrated in FIG. 15C, the image signal and the image data D10C (refer to FIG. 13C) generated by the POV camera 10C may be displayed on the main screen Sm, and the image signal and the image data D100 (refer to FIG. 14) generated by the imaging unit 111 may be displayed on the sub screen Ss1.

Figure 16:
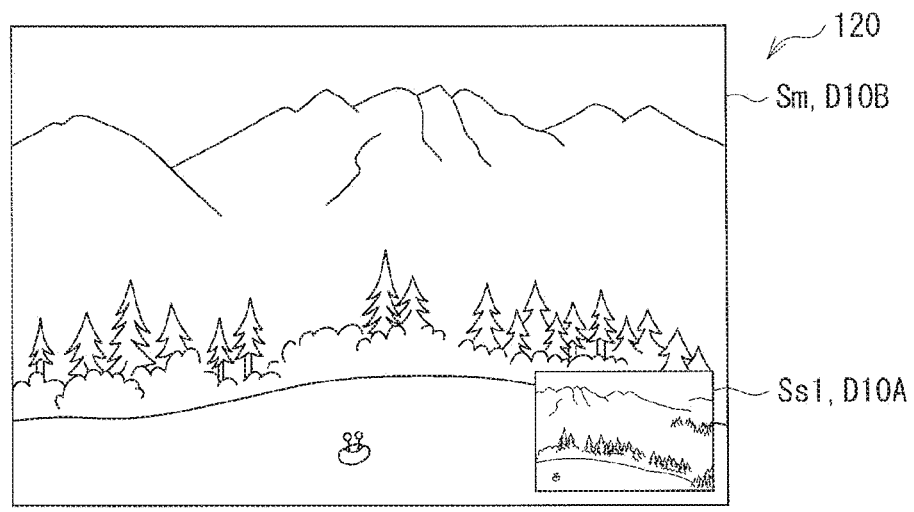
FIG. 16 is a diagram of one example of image-display provided by the display unit of the imaging device illustrated in FIG. 11.

Assume that the POV cameras 10A and 10B are selected to form the camera group; the main screen Sm is allocated to the image signal and the image data D10B generated by the POV camera 10B; and the sub screen Ss1 is allocated to the image signal and the image data D10A generated by the POV camera 10A. In this case, as illustrated in FIG. 16, the image signal and the image data D10B (refer to FIG. 13B) generated by the POV camera 10B may be displayed on the main screen Sm, and the image signal and the image data D10A (refer to FIG. 13A) generated by the POV camera 10A may be displayed on the sub screen Ss1.

Figure 17:
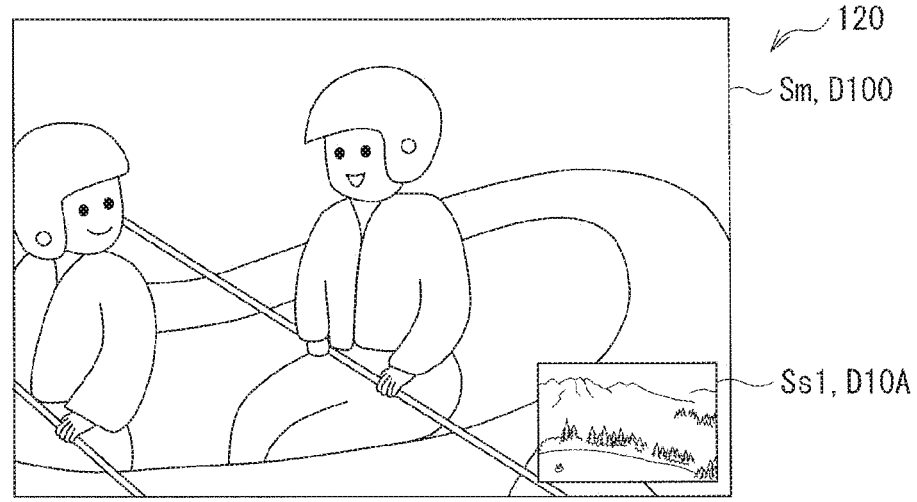
FIG. 17 is a diagram of one example of image-display provided by the display unit of the imaging device illustrated in FIG. 11.

Assume that the POV camera 10A and the imaging unit 111 are selected to form the camera group; the main screen Sm is allocated to the image signal and the image data D100 generated by the imaging unit 111; and the sub screen Ss1 is allocated to the image signal and the image data D10A generated by the POV camera 10A. In this case, as illustrated in FIG. 17, the image signal and the image data D100 (refer to FIG. 14) generated by the imaging unit 111 may be displayed on the main screen Sm, and the image signal and the image data D10A (refer to FIG. 13A) generated by the POV camera 10A may be displayed on the sub screen Ss1.

Figure 18:
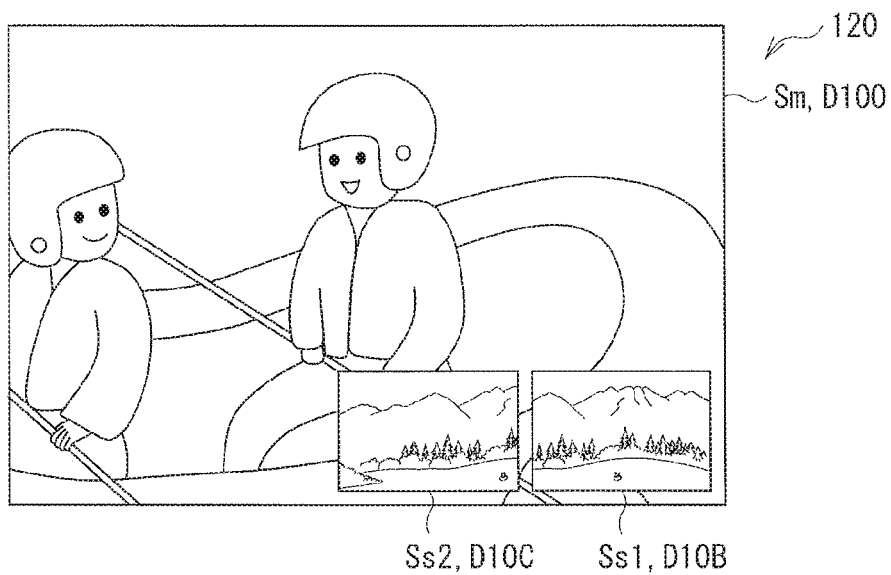
FIG. 18 is a diagram of one example of image-display provided by the display unit of the imaging device illustrated in FIG. 11.

Assume that the POV cameras 10B and 10C, and the imaging unit 111 are selected to form the camera group; the main screen Sm is allocated to the image signal and the image data D100 generated by the imaging unit 111; the sub screens Ss1 and Ss2 are allocated respectively to the image signals and the image data D10B and D10C generated by the POV cameras 10B and 10C. In this case, as illustrated in FIG. 18, the image signal and the image data D100 (refer to FIG. 14) generated by the imaging unit 111 may be displayed on the main screen Sm. The image signals and the image data D10B and D10C (refer to FIGS. 13B and 13C) generated by the POV cameras 10B and 10C may be displayed respectively on the sub screens Ss1 and Ss2.

Figure 19:
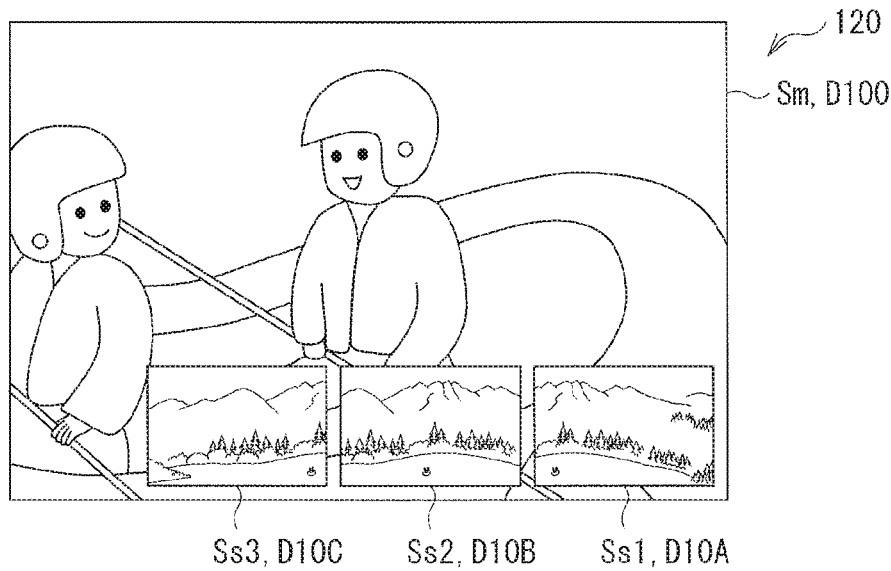
FIG. 19 is a diagram of one example of image-display provided by the display unit of the imaging device illustrated in FIG. 11.

Assume that the POV cameras 10A to 10C and the imaging unit 111 are selected to form the camera group; the main screen Sm is allocated to the image signal and the image data D100 generated by the imaging unit 111; the sub screens Ss1 to Ss3 are allocated respectively to the image signals and the image data D10A to D10C generated by the POV cameras 10A to 10C. In this case, as illustrated in FIG. 19, the image signal and the image data D100 (refer to FIG. 14) generated by the imaging unit 111 may be displayed on the main screen Sm. The image signals and the image data D10A to D10C (refer to FIGS. 13A to 13C) generated by the POV cameras 10A to 10C may be displayed on the sub screens Ss1 to Ss3.

As described, in the embodiment, the imaging device 100 includes the imaging unit 111, the body 121, and the communication unit 118. The body 121 is configured to be mechanically coupled to the plurality of POV cameras 10A to 10C that each are configured to selectively form a mechanical coupling to one of the surfboard, the bicycle, and the imaging device 100. The communication unit 118 is configured to communicate wirelessly with the plurality of POV cameras 10A to 10C. Hence, it is possible to use the imaging device 100 in combination with the plurality of POV cameras 10A to 10C, allowing for more diverse styles of photographing of the plurality of POV cameras 10A to 10C.

Moreover, the input unit 116 is configured to accept the operation of the one or more relevant POV cameras 10N out of the plurality of POV cameras 10A to 10C. The communication unit 118 is configured to transmit the instruction input signal generated based on the operation accepted by the input unit 116, to the communication units 18 of the one or more relevant POV cameras 10N. Hence, it is possible to perform various operations such as the zooming, the synchronous photographing, and the mode switching, in conjunction between the plurality of POV cameras 10A to 10C and the imaging device 100.

Furthermore, the communication unit 118 is configured to receive the image data D10N generated by the one or more relevant POV cameras 10N, from the communication units 18 of the one or more relevant POV cameras 10N, to allow the image data D10N to be stored in the memory card 114A of the imaging device 100. Hence, it is possible to expand a function of image data storage of the plurality of POV cameras 10A to 10C, leading to enhancement in convenience of the plurality of POV cameras 10A to 10C.

In addition, the communication unit 118 is configured to receive the image signals and the image data D10N generated by the one or more relevant POV cameras 10N out of the plurality of POV cameras 10A to 10C, from the communication units 18 of the one or more relevant POV cameras 10N, to allow the display unit 120 of the imaging device 100 to provide image-display of the image signals and the image data D10N. This allows for image-display of the image signals and the image data D10A to D10C generated by the plurality of POV cameras 10A to 10C, even in a case in which the indicator units 19 of the plurality of POV cameras 10A to 10C do not perform image-display. Hence, it is possible to enhance convenience of the plurality of POV cameras 10A to 10C.

Figure 20:
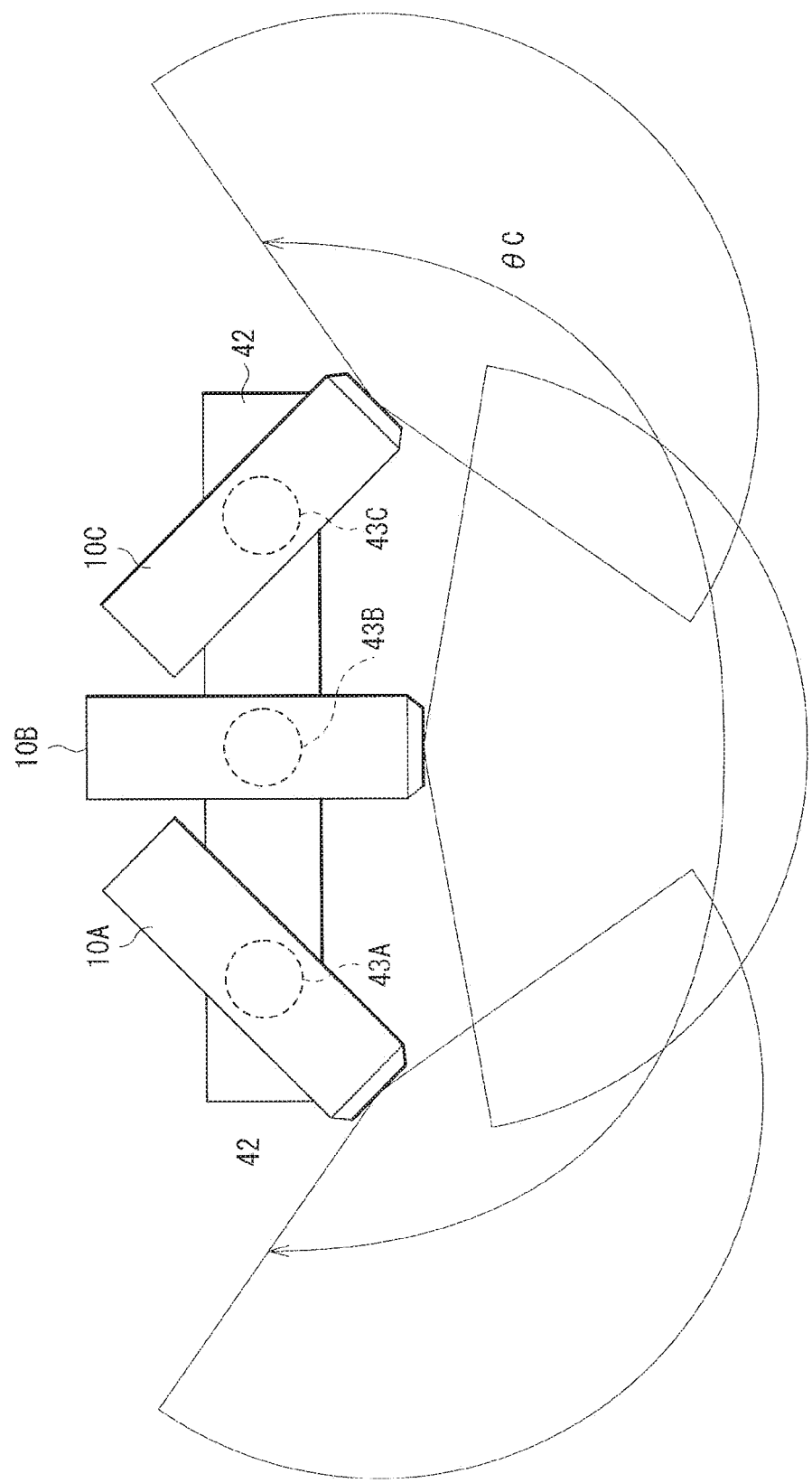
FIG. 20 is a top view of a still another application example of the imaging system.

In the embodiment as described above, description is given on a case in which the plurality of tripod screws 43A to 43C are fastened to the plurality of POV cameras 10A to 10C to allow the plurality of POV cameras 10A to 10C to be oriented in a same direction. However as illustrated in FIG. 20, the plurality of tripod screws 43A to 43C may be fastened to the plurality of POV cameras 10A to 10C to allow the plurality of POV cameras 10A to 10C to be oriented in different directions. This makes it possible to enlarge a collective angle of view αC of the plurality of POV cameras 10A to 10C. In this case, the zooming in the plurality of POV cameras 10A to 10C may be performed in conjunction with one another.

(Third Embodiment)

Figure 21:
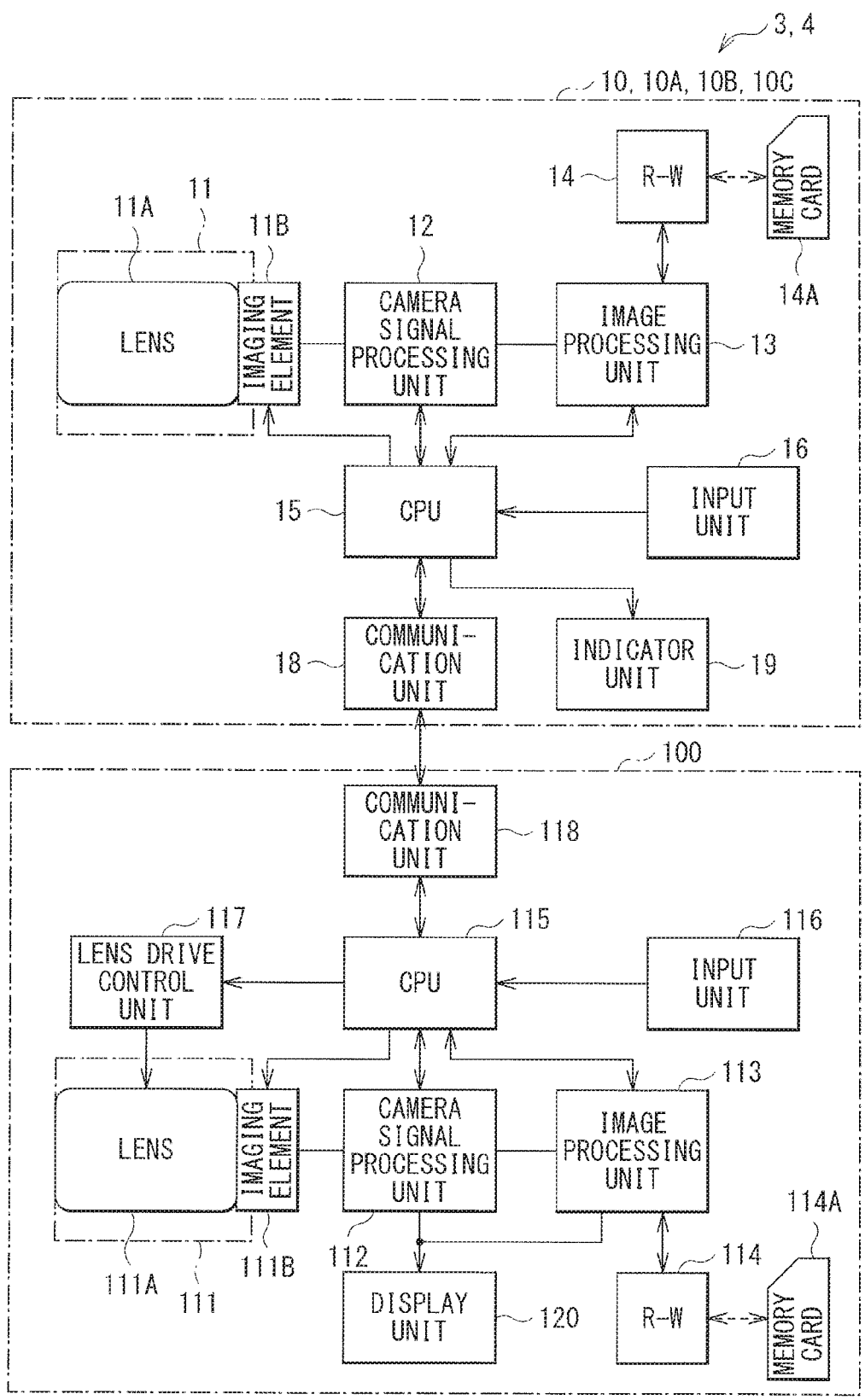
FIG. 21 is a block diagram of an imaging system that includes a POV camera and an imaging device according to a third embodiment of the disclosure.

FIG. 21 illustrates a configuration example of an imaging system 3 according to a third embodiment of the disclosure. In the imaging system 3, one POV camera 10 is mechanically coupled to the imaging device 100, and communicates in a wired way with the imaging device 100. Specifically, the communication unit 18 of the POV camera 10 may be electrically coupled to the communication unit 118 of the imaging device 100 through a cable, a connector, a hot shoe, wirings, or other electrical coupling parts, allowing for transmission and reception of various signals and image data between the communication units 18 and 118. Otherwise, the imaging system 3 may have similar configurations, workings, and effects to those of the forgoing first embodiment. Accordingly, description is given with corresponding components denoted by same references.

Figure 22:
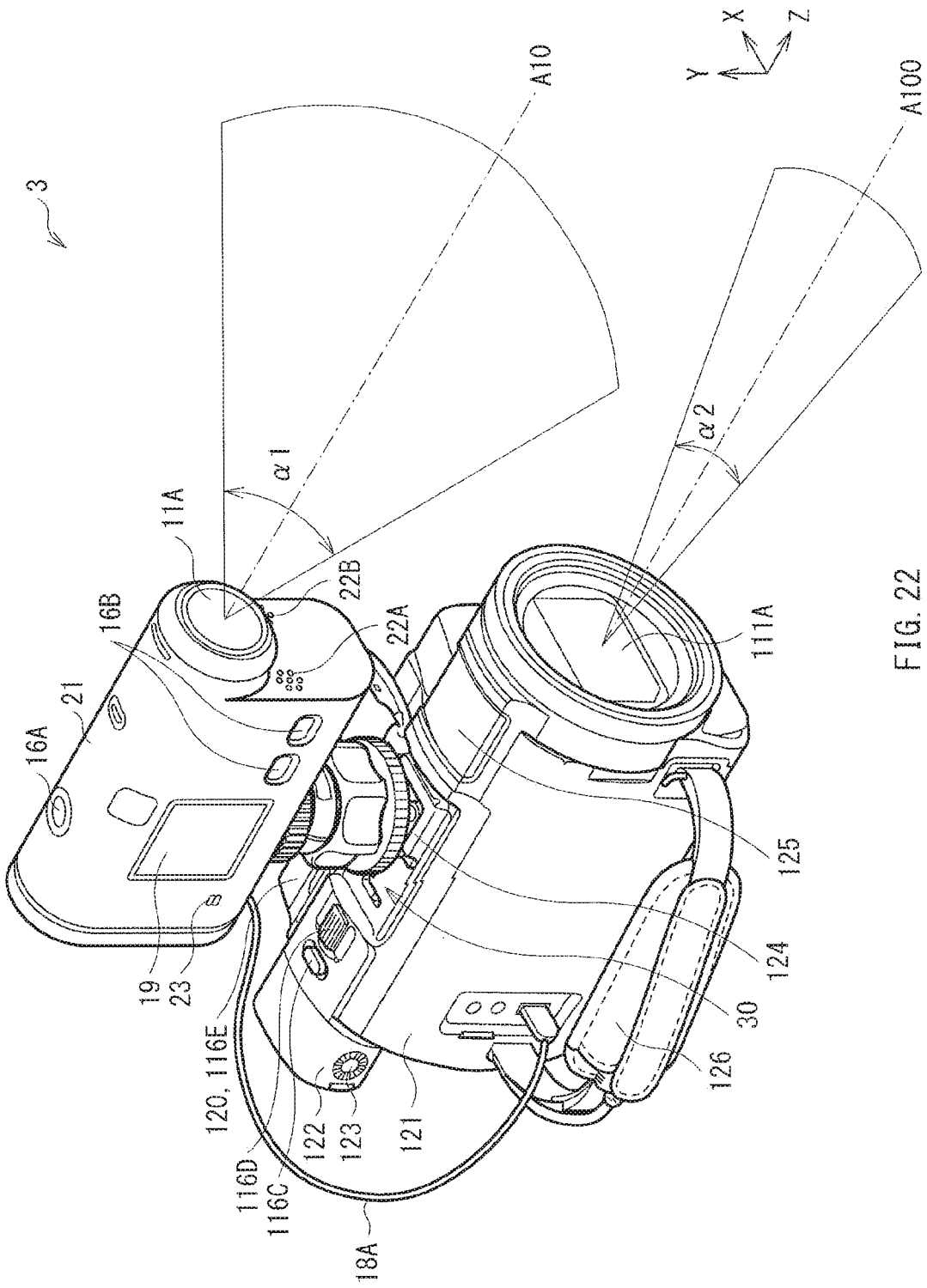
FIG. 22 is a perspective view of an application example of the imaging device illustrated in FIG. 21.

FIG. 22 illustrates an application example of the imaging system 3. In the imaging system 3, the communication unit 18 of the POV camera 10 may be electrically coupled to the communication unit 118 of the imaging device 100 through a cable 18A. This allows the communication unit 18 of the POV camera 10 to communicate in a wired way with the communication unit 118 of the imaging device 100.

Figure 23:
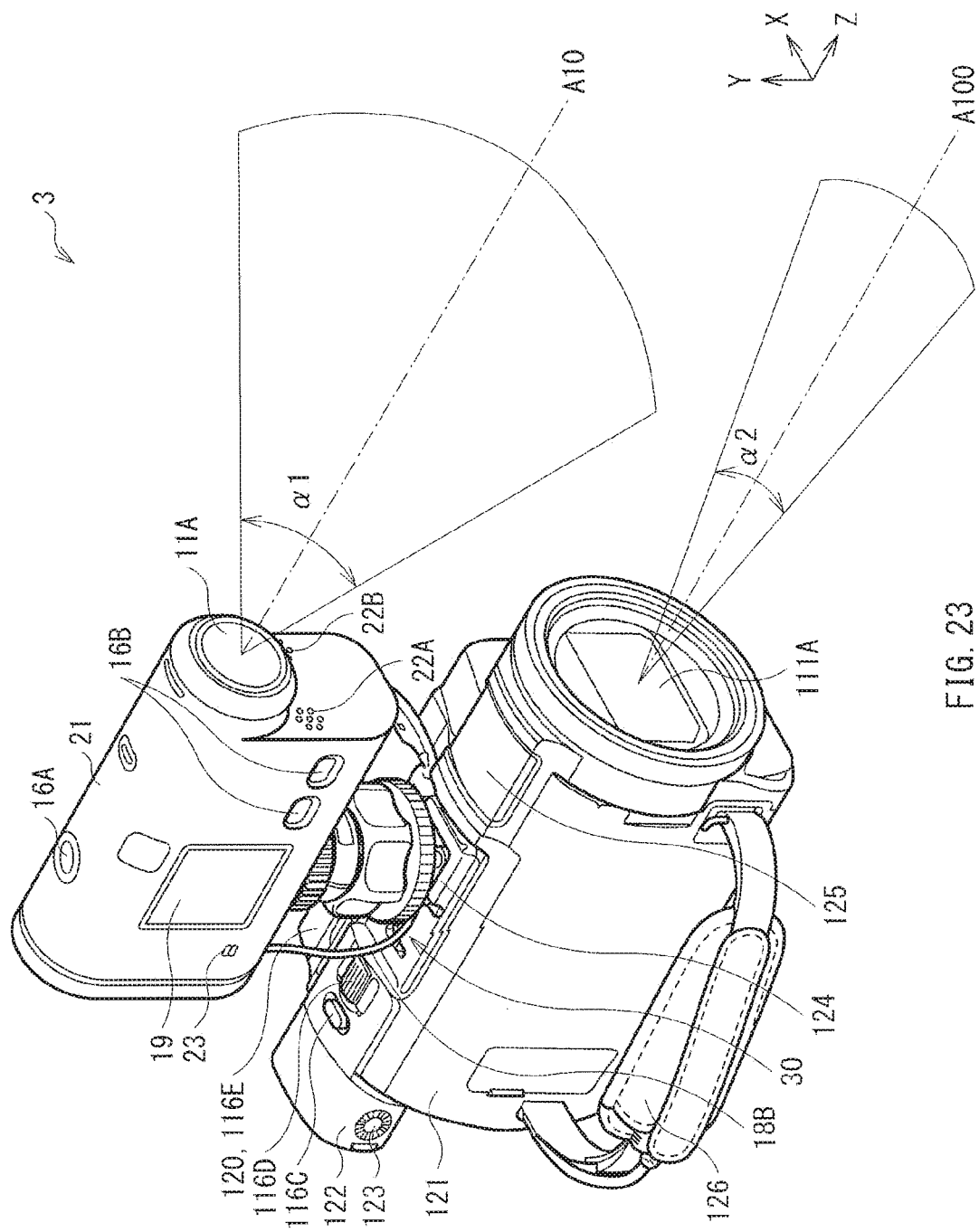
FIG. 23 is a perspective view of another application example of the imaging device illustrated in FIG. 21.
Figure 24:
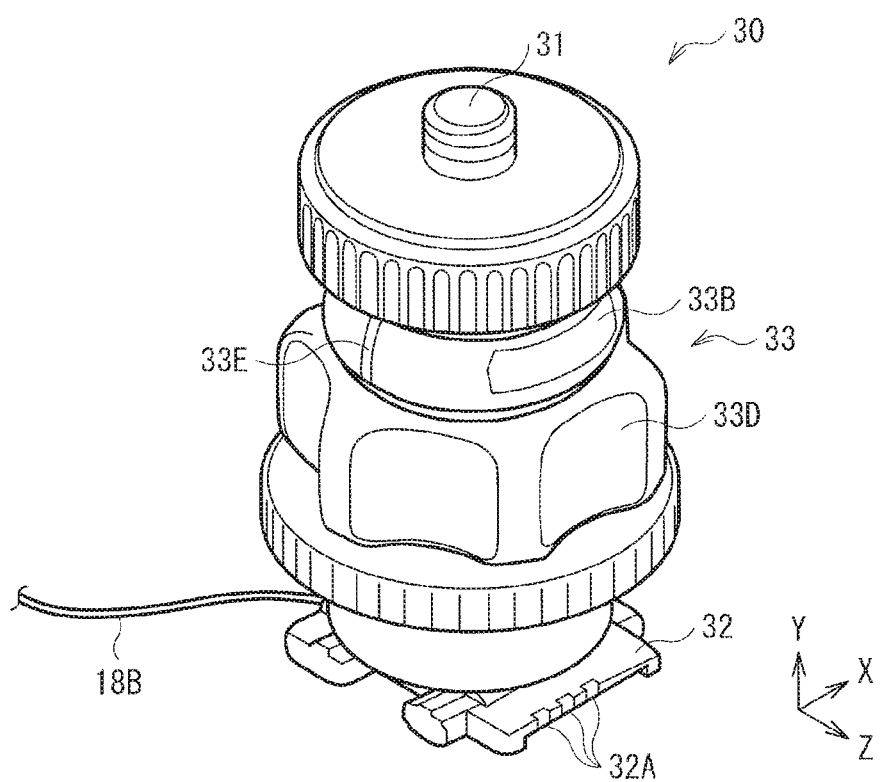
FIG. 24 is a perspective view of the shoe-mounting member illustrated in FIG. 23

FIG. 23 illustrates another application example of the imaging system 3. In the imaging system 3, as illustrated in FIG. 24, the foot 32 of the shoe-mounting member 30 may include an electronic contact 32A. The electronic contact 32A allows the foot 32 to be electrically coupled to the imaging device 100 through the shoe 124 that is a hot shoe. The foot 32 may be also electrically coupled to the POV camera 10 through a cable 18B. Thus, the communication unit 18 of the POV camera 10 may be electrically coupled to the communication unit 118 of the imaging device 100 through the shoe 124 and the cable 18B. This allows the communication unit 18 of the POV camera 10 to communicate in a wired way with the communication unit 118 of the imaging device 100.

(Fourth Embodiment)

Figure 25:
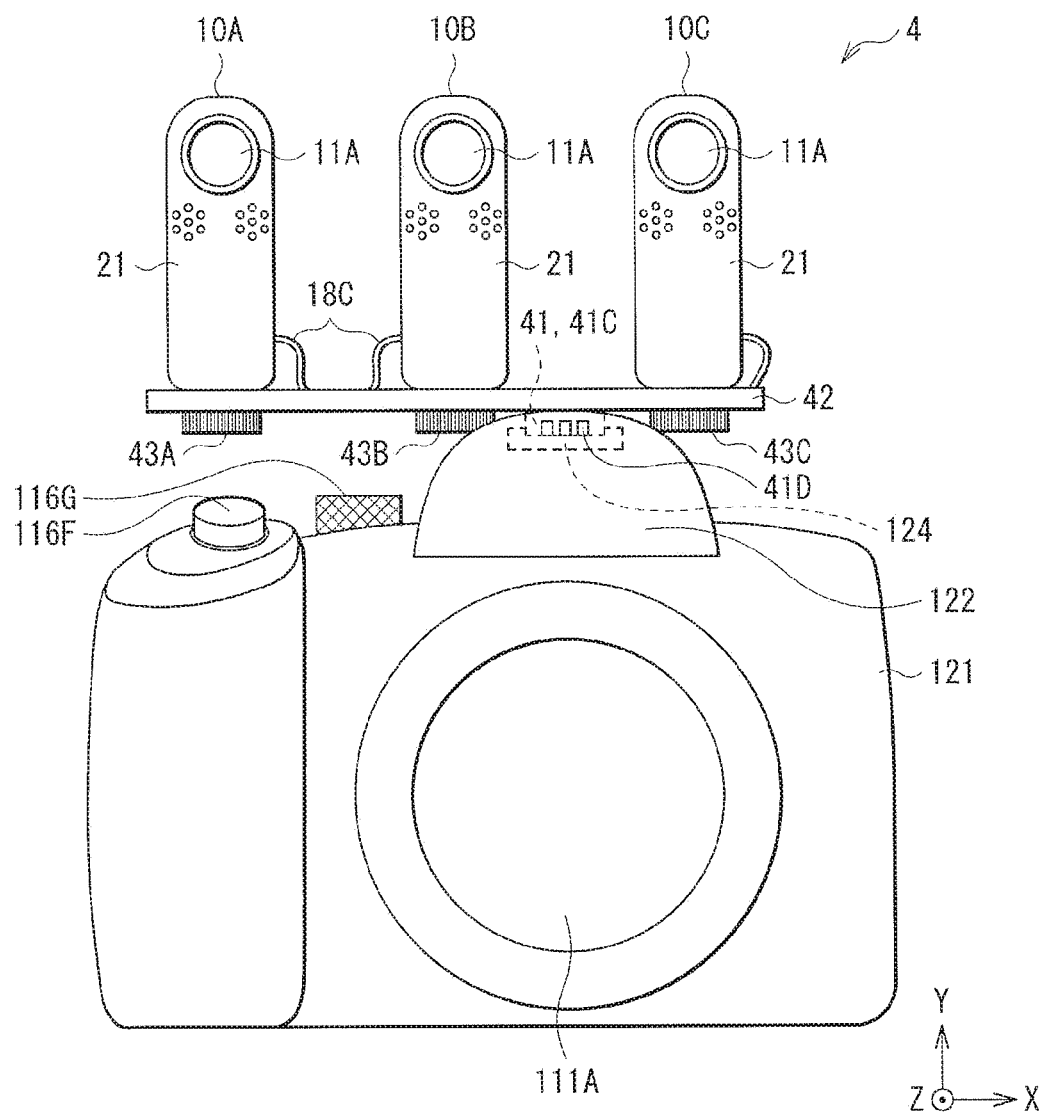
FIG. 25 is a front view of an imaging system that includes POV cameras and an imaging device according to a fourth embodiment of the disclosure.

FIG. 25 illustrates an application example of an imaging system 4 according to a fourth embodiment of the disclosure. In the imaging system 4, as illustrated in FIG. 21, a plurality of (e.g., three) POV cameras 10A to 10C are mechanically coupled to the imaging device 100, and communicate in a wired way with the imaging device 100. Otherwise, the imaging system 4 may have similar configurations, workings, and effects to those of the forgoing second and third embodiments. Accordingly, description is given with corresponding components denoted by same references.

In the imaging system 4, as illustrated in FIG. 25, the foot 41C of the coupling part 41 of the intermediate member 40 may include an electronic contact 41D. The electronic contact 41D allows the foot 41C to be electrically coupled to the imaging device 100 through the shoe 124 that is a hot shoe. The foot 41C may be also electrically coupled to each of the plurality of POV cameras 10A to 10C through cables 18C and undepicted wirings provided on the extension part 42. Thus, the communication units 18 of the plurality of POV cameras 10A to 10C may be electrically coupled to the communication unit 118 of the imaging device 100 through the shoe 124 and the cables 18C. This allows the communication units 18 of the plurality of POV cameras 10A to 10C to communicate in a wired way with the communication unit 118 of the imaging device 100.

Although description has been made by giving the example embodiments as mentioned above, the contents of the disclosure are not limited to the above-mentioned example embodiments and may be modified in a variety of ways.

For example, in the forgoing example embodiments, description is given on a case that the shoe 124 of the imaging device 100 is a hot shoe that includes the electronic contact. However, the shoe 124 is not limited to the hot shoe, but may be a cold shoe that includes no electronic contact and is aimed for mechanical fixation of an external appliance.

Moreover, for example, in the forgoing example embodiments, description is given on a case with the display unit 120 in which the main screen Sm corresponds to all of the display unit 120, the sub screen Ss1 corresponds to part of the display unit 120, and the main screen Sm is displayed in a larger size than that of the sub screen Ss1. However, the main screen Sm may correspond to part, e.g., a left half, of the display unit 120, the sub screen Ss1 may correspond to part, e.g., a right half, of the display unit 120, and the main screen Sm may be displayed in an equal size to that of the sub screen Ss1.

Furthermore, for example, shapes, dimensions, and materials of each component, or coupling methods described in the forgoing example embodiments are non-limiting, but other shapes, other dimensions, and other materials, or other coupling methods may be adopted.

In addition, for example, in the forgoing example embodiments, description is given with specific examples of configurations of the imaging systems 1 to 4, the POV cameras 10 and 10A to 10C, and the imaging device 100. However, it is not necessary to include all the components described above, and rather a component or components other than the above-mentioned components may be also included.

Figure 26:
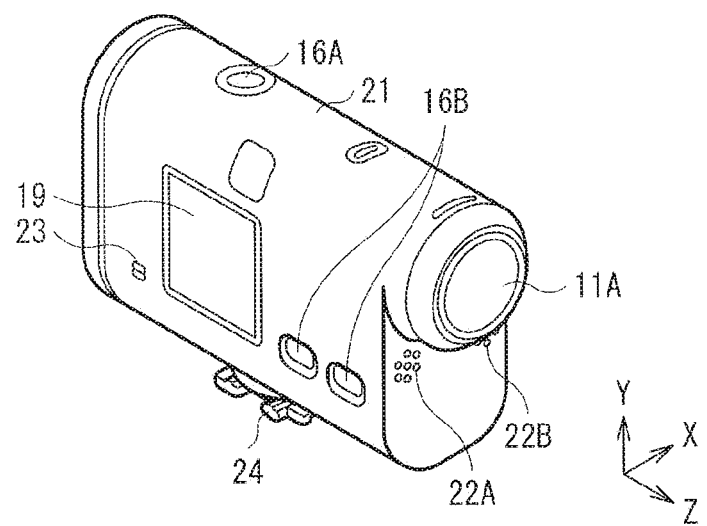
FIG. 26 is a perspective view of a POV camera according to a modification example.
Figure 27:
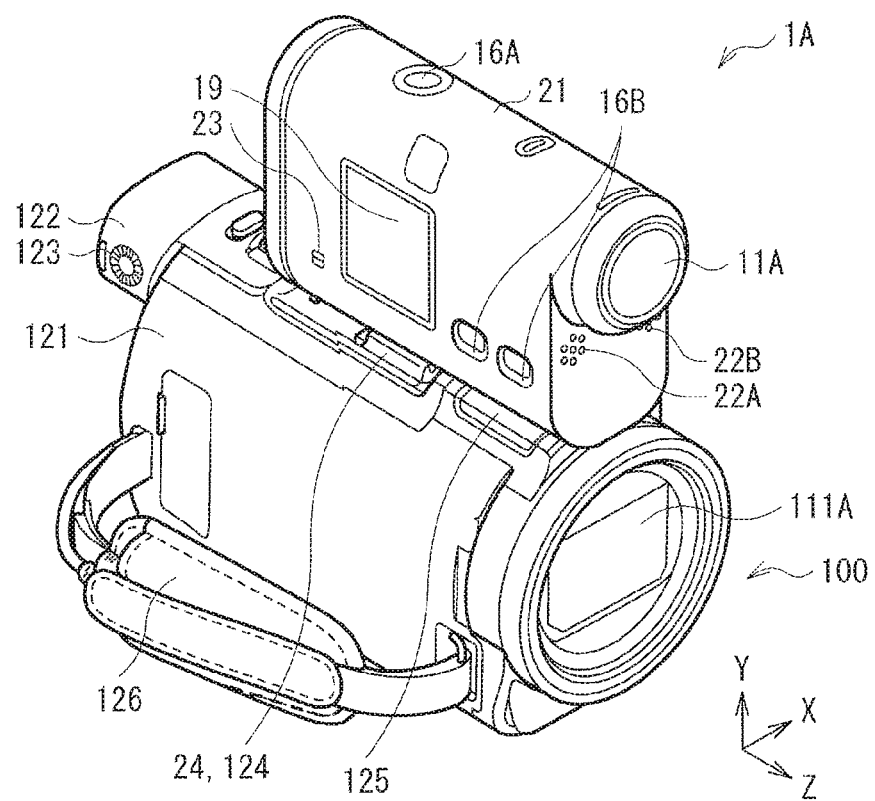
FIG. 27 is a perspective view of an application example of an imaging system that includes the POV camera illustrated in FIG. 26 and an imaging device.

Furthermore, for example, in the first embodiment, description is given on a case that the body 21 of the POV camera 10 is configured to be mechanically coupled to the shoe 124 of the imaging device 100 with the shoe-mounting member 30 in between. However, for example, as illustrated in FIG. 26, the POV camera 10 may include a foot 24 on its bottom surface. The foot 24 may be similar to the foot 32 of the shoe-mounting member 30. This makes it possible to eliminate the shoe-mounting member 30 from an imaging system 1A as illustrated in FIG. 27, allowing for a direct mechanical coupling of the body 21 of the POV camera 10 to the shoe 124 of the imaging device 100.

As used herein, the term "sheet" may be used interchangeably with the term "plate".

It is to be noted that the effects described in the above-described embodiments and so forth are merely exemplified and not limitative, and effects of the present disclosure may be other effects or may further include other effects.

It is possible to achieve at least the following configurations from the above-described example embodiments of the technology.

(1) A point of view camera, including:
an imaging unit;
a body configured to selectively form a mechanical coupling to one of a surfboard, a bicycle, and an associate imaging device; and
a communication unit configured to communicate wirelessly or in a wired way with the associate imaging device.

(2) The point of view camera according to (1),
wherein the body is configured to be mechanically coupled to a shoe of the associate imaging device.

(3) The point of view camera according to (2),
wherein the body is configured to be mechanically coupled to the shoe of the associate imaging device with a shoe-mounting member in between, the shoe-mounting member including:
a tripod screw configured to be fastened to the body;
a foot configured to be fitted in the shoe of the associate imaging device; and
a free platform provided between the tripod screw and the foot.

(4) The point of view camera according to (3),
wherein the shoe of the associate imaging device is a hot shoe,
the foot includes an electronic contact that allows the foot to be electrically coupled to the associate imaging device through the hot shoe, and
the foot is configured to be electrically coupled by a cable to the point of view camera.

(5) The point of view camera according to any one of (1) to (4),
wherein the communication unit is configured to receive an instruction input signal from an associate communication unit of the associate imaging device, the instruction input signal being generated based on an operation of the point of view camera accepted by an associate input unit of the associate imaging device.

(6) The point of view camera according to (5),
wherein the instruction input signal includes one or more of zooming in the point of view camera, execution of photographing of the point of view camera in synchronization with photographing of the associate imaging device, switching of modes of the point of view camera, storage of image data generated by the point of view camera, and image-display of an image signal and the image data generated by the point of view camera.

(7) The point of view camera according to (5) or (6),
wherein the communication unit is configured to transmit image data generated by the point of view camera, to the associate communication unit of the associate imaging device, to allow the image data to be stored in an associate storage unit of the associate imaging device.

(8) The point of view camera according to any one of (5) to (7),
wherein the communication unit is configured to transmit an image signal and image data generated by the point of view camera, to the associate communication unit of the associate imaging device, to allow an associate display unit of the associate imaging device to provide image-display of the image signal and the image data generated by the point of view camera.

(9) The point of view camera according to (8),
wherein the instruction input signal includes allowing the associate display unit of the associate imaging device to provide image-display of the image signal and the image data generated by the point of view camera, simultaneously with an image signal and image data generated by the associate imaging device.

(10) The point of view camera according to (9),
wherein the associate display unit of the associate imaging device is configured to simultaneously display a main screen and one or more sub screens, the main screen corresponding to part or all of the associate display unit, and the one or more sub screens each corresponding to part of the associate display unit,
the one or more sub screens include a sub screen, and
the instruction input signal includes allocation of the main screen and the sub screen, to the image signal and the image data generated by the point of view camera, and to the image signal and the image data generated by the associate imaging device.

(11) The point of view camera according to (10), further including an image processing unit configured to adjust, based on the allocation, resolution of the image signal and the image data generated by the point of view camera.

(12) A point of view camera, including:
an imaging unit that performs photographing with use of a lens having a first angle of view;
a body configured to be mechanically coupled to an associate imaging device that performs photographing with use of a lens having a second angle of view that is smaller than the first angle of view; and
a communication unit configured to communicate wirelessly or in a wired way with the associate imaging device.

(13) A point of view camera, including:
an imaging unit that generates an image signal and image data;
a body configured to be mechanically coupled to an associate imaging device that includes an associate display unit that provides image-display; and
a communication unit configured to communicate wirelessly or in a wired way with the associate imaging device,
wherein the point of view camera includes no display unit that provides image-display of the image signal and the image data generated by the imaging unit.

(14) The point of view camera according to (13), further including an indicator unit configured to provide indication of information other than the image signal and the image data generated by the imaging unit.

(15) An imaging device, including:
an imaging unit;
a body configured to be mechanically coupled to one or more associate point of view cameras that each are configured to selectively form a mechanical coupling to one of a surfboard, a bicycle, and an associate imaging device; and
a communication unit configured to communicate wirelessly or in a wired way with the one or more associate point of view cameras.

(16) The imaging device according to (15), further including a shoe,
wherein the one or more associate point of view cameras include an associate point of view camera, and
the shoe is configured to be mechanically coupled to an associate body of the associate point of view camera.

(17) The imaging device according to (16),
wherein the shoe is configured to be mechanically coupled to the associate body of the associate point of view camera with a shoe-mounting member in between, the shoe-mounting member including:
a tripod screw configured to be fastened to the associate body of the associate point of view camera;
a foot configured to be fitted in the shoe; and
a free platform provided between the tripod screw and the foot.

(18) The imaging device according to (15),
wherein the one or more associate point of view cameras include a plurality of associate point of view cameras,
the body is configured to be mechanically coupled to the plurality of associate point of view cameras with an intermediate member in between, the intermediate member including:
a coupling part configured to be mechanically coupled to the body;
an extension part extended from the coupling part along the body; and
a plurality of tripod screws provided on the extension part and configured to be fastened to the plurality of point of view cameras.

(19) The imaging device according to (18),
wherein the coupling part includes a plate and a tripod screw configured to be fastened to a bottom of the body with the plate in between.

(20) The imaging device according to (18), further including a shoe,
wherein the coupling part includes a foot configured to be fitted in the shoe.

(21) The imaging device according to (20),
wherein the shoe is a hot shoe,
the foot includes an electronic contact that allows the foot to be electrically coupled to the imaging device through the hot shoe, and
the foot is configured to be electrically coupled by a cable to each of the plurality of associate point of view cameras.

(22) The imaging device according to any one of (18) to (21),
wherein the plurality of tripod screws are configured to be fastened to the plurality of associate point of view cameras to allow the plurality of associate point of view cameras to be oriented in different directions.

(23) The imaging device according to any one of (15) to (22), further including an input unit configured to accept an operation of one or more relevant point of view cameras out of the one or more associate point of view cameras,
wherein the communication unit is configured to transmit an instruction input signal to associate communication units of the one or more relevant point of view cameras involved in the operation, the instruction input signal being generated based on the operation accepted by the input unit.

(24) The imaging device according to (23),
wherein the instruction input signal includes one or more of zooming in the one or more relevant point of view cameras, execution of photographing of the one or more relevant point of view cameras in synchronization with photographing of the imaging unit, switching of modes of the one or more relevant point of view cameras, storage of image data generated by the one or more relevant point of view cameras, and image-display of image signals and the image data generated by the one or more relevant point of view cameras.

(25) The imaging device according to (23) or (24), further including a storage unit that provides image data storage,
wherein the communication unit is configured to receive image data generated by the one or more relevant point of view cameras, from the associate communication units of the one or more relevant point of view cameras, and
the storage unit stores the image data received by the communication unit.

(26) The imaging device according to any one of (23) to (25), further including a display unit that provides image-display,
wherein the communication unit is configured to receive image signals and image data generated by the one or more relevant point of view cameras, from the associate communication units of the one or more relevant point of view cameras, and
the display unit provides image-display of the image signal and the image data received by the communication unit.

(27) The imaging device according to (26),
wherein the display unit is configured to display the image signals and the image data generated by the one or more relevant point of view cameras, simultaneously with an image signal and image data generated by the imaging unit, and the instruction input signal includes allowing the display unit to provide image-display of the image signals and the image data generated by the one or more relevant point of view cameras, simultaneously with the image signal and the image data generated by the imaging unit.

(28) The imaging device according to (27), wherein the display unit is configured to simultaneously display a main screen and one or more sub screens, the main screen corresponding to part or all of the display unit, and the one or more sub screens each corresponding to part of the display unit, and the instruction input signal includes formation of a camera group that includes two or more selected from the one or more relevant point of view cameras and the imaging unit, and allocation of the main screen and the one or more sub screens, to the image signals and the image data generated by the two or more involved in the camera group.

(29) An imaging device, including:

an imaging unit that performs photographing with use of a lens having a third angle of view;

a body configured to be mechanically coupled to one or more associate point of view cameras that each perform photographing with use of a lens having a fourth angle of view that is larger than the third angle of view; and a communication unit configured to communicate wirelessly or in a wired way with the one or more associate point of view cameras.

(30) An imaging device, including:

an imaging unit;

a display unit that provides image-display;

a body configured to be mechanically coupled to one or more associate point of view cameras that each generate an image signal and image data but include no display unit that provides image-display of the image signal and the image data generated; and a communication unit configured to communicate wirelessly or in a wired way with the one or more associate point of view cameras.

It should be understood by those skilled in the art that various modifications, combinations, sub-combinations and alterations may occur depending on design requirements and other factors insofar as they are within the scope of the appended claims or the equivalents thereof.

What is claimed is:

1. A point of view camera, comprising:
an imaging unit;
a body configured to provide a housing for the imaging unit and to form a mechanical coupling to a non-imaging equipment and an associate imaging device, the mechanical coupling being selective such that the body is connected to the associate imaging device or is connected to the non-imaging equipment; and
communication circuitry arranged within the body, the communication circuitry being configured to communicate wirelessly with the associate imaging device, wherein the associate imaging device communicates with an other point of view camera,
wherein the communication circuitry is configured to receive instruction input signals from associate communication circuitry of the associate imaging device, the instruction input signals being generated based on operations of the point of view camera that have been accepted by an associate input of the associate imaging device,
wherein the instruction input signals include synchronous photographing with the associate imaging device, storage of image data generated by the point of view camera, and image-display of an image signal and the image data generated by the point of view camera,
wherein both the point of view camera and the other point of view camera receive the synchronous photographing instruction signal as one of the instruction input signals from the associate imaging device, and
wherein the instruction input signals include zooming in the point of view camera and, distinct from the zooming in the point of view camera, switching of modes of the point of view camera.

2. The point of view camera according to claim 1,
wherein the body is configured to be mechanically coupled to a shoe of the associate imaging device.

3. The point of view camera according to claim 2,
wherein the body is configured to be mechanically coupled to the shoe of the associate imaging device with a shoe-mounting member in between, the shoe-mounting member including:
a tripod screw configured to be fastened to the body;
a foot configured to be fitted in the shoe of the associate imaging device; and
a free platform provided between the tripod screw and the foot.

4. The point of view camera according to claim 3,
wherein the shoe of the associate imaging device is a hot shoe,
the foot includes an electronic contact that allows the foot to be electrically coupled to the associate imaging device through the hot shoe, and
the foot is configured to be electrically coupled by a cable to the point of view camera.

5. The point of view camera according to claim 1,
wherein the associate communication circuitry of the associate imaging device is configured to allow the image data to be stored in an associate storage unit of the associate imaging device.

6. The point of view camera according to claim 1,
wherein the communication circuitry is configured to transmit the image signal and the image data generated by the point of view camera, to the associate communication circuitry of the associate imaging device, to allow an associate display unit of the associate imaging device to provide image-display of the image signal and the image data generated by the point of view camera.

7. The point of view camera according to claim 6
wherein the instruction input signal includes allowing the associate display unit of the associate imaging device to provide image-display of the image signal and the image data generated by the point of view camera, simultaneously with an image signal and image data generated by the associate imaging device.

8. The point of view camera according to claim 7,
wherein the associate display unit of the associate imaging device is configured to simultaneously display a main screen and one or more sub screens, the main screen corresponding to part or all of the associate display unit, and the one or more sub screens each corresponding to part of the associate display unit,
the one or more sub screens include a sub screen, and
the instruction input signal includes allocation of the main screen and the sub screen, to the image signal and the image data generated by the point of view camera, and to the image signal and the image data generated by the associate imaging device.

9. The point of view camera according to claim 8, further comprising an image processing unit configured to adjust, based on the allocation, resolution of the image signal and the image data generated by the point of view camera.

10. A point of view camera, comprising:
an imaging unit that generates an image signal and image data;
a body configured to provide a housing for the imaging unit and to form a mechanical coupling to a non-imaging equipment and an associate imaging device that includes an associate display unit that provides image-display, the mechanical coupling being selective such that the body is connected to the associate imaging device or is connected to the non-imaging equipment; and
communication circuitry arranged within the body, the communication circuitry being configured to communicate wirelessly with the associate imaging device, wherein the associate imaging device communicates with an other point of view camera,
wherein the communication circuitry is configured to receive instruction input signals from associate communication circuitry of the associate imaging device, the instruction input signals being generated based on operations of the point of view camera that have been accepted by an associate input of the associate imaging device,
wherein the instruction input signals include synchronous photographing with the associate imaging device and storage of image data generated by the point of view camera, and
wherein both the point of view camera and the other point of view camera receive the synchronous photographing instruction signal as one of the instruction input signals from the associate imaging device,
wherein the point of view camera includes no display unit that provides image-display of the image signal and the image data generated by the imaging unit
wherein the instruction input signals include zooming in the point of view camera and, distinct from the zooming in the point of view camera, switching of modes of the point of view camera.

11. The point of view camera according to claim 10, further comprising an indicator configured to provide indication of information other than the image signal and the image data generated by the imaging unit.

12. An imaging device, comprising:
an imaging unit;
a body configured to be mechanically coupled to one or more associate point of view cameras that each are configured to form a mechanical coupling to a non-imaging equipment and an associate imaging device, the mechanical coupling being selective such that the one or more associate point of view cameras are, respectively, connected to the non-imaging equipment or the associate imaging device; and
communication circuitry configured to communicate wirelessly with the one or more associate point of view cameras when the one or more associate point of view cameras do not form the mechanical coupling,
wherein the communication circuitry is configured to send instruction input signals to associate communication circuitry of the one or more associate point of view cameras, the instruction input signals being generated based on operations of the one or more associate point of view cameras that have been accepted by an input of the imaging device,
wherein the instruction input signals include synchronous photographing with the one or more associate point of view cameras, storage of image data generated by the one or more point of view cameras, and image-display of an image signal and the image data generated by the one or more point of view cameras, and
wherein the instruction input signals include zooming in the one or more point of view cameras and, distinct from the zooming in the one or more point of view cameras, switching of modes of the one or more point of view cameras.

13. The imaging device according to claim 12, further comprising a shoe,
wherein the one or more associate point of view cameras include an associate point of view camera, and
the shoe is configured to be mechanically coupled to an associate body of the associate point of view camera.

14. The imaging device according to claim 13,
wherein the shoe is configured to be mechanically coupled to the associate body of the associate point of view camera with a shoe-mounting member in between, the shoe-mounting member including:
a tripod screw configured to be fastened to the associate body of the associate point of view camera;
a foot configured to be fitted in the shoe; and
a free platform provided between the tripod screw and the foot.

15. The imaging device according to claim 12,
wherein the one or more associate point of view cameras include a plurality of associate point of view cameras,
the body is configured to be mechanically coupled to the plurality of associate point of view cameras with an intermediate member in between, the intermediate member including:
a coupling part configured to be mechanically coupled to the body;
an extension part extended from the coupling part along the body; and
a plurality of tripod screws provided on the extension part and configured to be fastened to the plurality of point of view cameras.

16. The imaging device according to claim 15,
wherein the coupling part includes a plate and a tripod screw configured to be fastened to a bottom of the body with the plate in between.

17. The imaging device according to claim 15, further comprising a shoe,
wherein the coupling part includes a foot configured to be fitted in the shoe.

18. The imaging device according to claim 17,
wherein the shoe is a hot shoe,
the foot includes an electronic contact that allows the foot to be electrically coupled to the imaging device through the hot shoe, and
the foot is configured to be electrically coupled by a cable to each of the plurality of associate point of view cameras.

19. The imaging device according to claim 15,
wherein the plurality of tripod screws are configured to be fastened to the plurality of associate point of view cameras to allow the plurality of associate point of view cameras to be oriented in different directions.

20. The imaging device according to claim 12, further comprising:
- a storage unit that provides image data storage,
- wherein the communication circuitry is configured to receive the image data generated by the one or more point of view cameras, from the associate circuitry of the one or more point of view cameras, and
- the storage unit stores the image data received by the communication circuitry.

21. The imaging device according to claim 12, further comprising:
- a display unit that provides image-display,
- wherein the communication circuitry is configured to receive the image signals and the image data generated by the one or more point of view cameras, from the associate circuitry of the one or more point of view cameras, and
- the display unit provides image-display of the image signal and the image data received by the communication circuitry.

22. The imaging device according to claim 21,
- wherein the display unit is configured to display the image signals and the image data generated by the one or more relevant point of view cameras, simultaneously with an image signal and image data generated by the imaging unit, and
- the instruction input signal includes allowing the display unit to provide image-display of the image signals and the image data generated by the one or more relevant point of view cameras, simultaneously with the image signal and the image data generated by the imaging unit.

23. The imaging device according to claim 22,
- wherein the display unit is configured to simultaneously display a main screen and one or more sub screens, the main screen corresponding to part or all of the display unit, and the one or more sub screens each corresponding to part of the display unit, and
- the instruction input signal includes formation of a camera group that includes two or more selected from the one or more relevant point of view cameras and the imaging unit, and allocation of the main screen and the one or more sub screens, to the image signals and the image data generated by the two or more involved in the camera group.

24. A point of view camera, comprising:
- an imaging unit that performs photographing with use of a lens having a first angle of view;
- a body configured to provide a housing for the imaging unit and to form a mechanical coupling to a non-imaging equipment and an associate imaging device that performs photographing with use of a lens having a second angle of view that is smaller than the first angle of view, the mechanical coupling being selective such that the body is connected to the associate imaging device or is connected to the non-imaging equipment; and
- communication circuitry arranged within the body, the communication circuitry being configured to communicate wirelessly with the associate imaging device, wherein the associate imaging device communicates with an other point of view camera,
- wherein the communication circuitry is configured to receive instruction input signals from associate communication circuitry of the associate imaging device, the instruction input signals being generated based on operations of the point of view camera that have been accepted by an associate input of the associate imaging device,
- wherein the instruction input signals include synchronous photographing with the associate imaging device, storage of image data generated by the point of view camera, and image-display of an image signal and the image data generated by the point of view camera,
- wherein both the point of view camera and the other point of view camera receive the synchronous photographing instruction signal as one of the instruction input signals from the associate imaging device,
- wherein the instruction input signals include zooming in the point of view camera and, distinct from the zooming in the point of view camera, switching of modes of the point of view camera.

* * * * *